(12) United States Patent
Sollie et al.

(10) Patent No.: US 10,766,660 B2
(45) Date of Patent: Sep. 8, 2020

(54) INSULATED BOX ASSEMBLY WITH OVERLAPPING PANELS

(71) Applicant: Pratt Retail Specialties, LLC, Conyers, GA (US)

(72) Inventors: Greg Sollie, Sharpsburg, GA (US); Jamie Waltermire, Peachtree City, GA (US); Shifeng Chen, Newport News, VA (US)

(73) Assignee: Pratt Retail Specialties, LLC, Conyers, GA (US)

( * ) Notice: Subject to any disclaimer, the term of this patent is extended or adjusted under 35 U.S.C. 154(b) by 0 days.

(21) Appl. No.: 16/382,710

(22) Filed: Apr. 12, 2019

(65) Prior Publication Data

US 2020/0148409 A1 May 14, 2020

Related U.S. Application Data

(60) Provisional application No. 62/760,672, filed on Nov. 13, 2018.

(51) Int. Cl.
*B65D 5/22* (2006.01)
*B65D 5/64* (2006.01)
(Continued)

(52) U.S. Cl.
CPC ............ *B65D 5/22* (2013.01); *B31B 50/262* (2017.08); *B65D 5/2057* (2013.01); *B65D 5/64* (2013.01);
(Continued)

(58) Field of Classification Search
CPC .......... B65D 5/22; B65D 5/2057; B65D 5/64; B65D 81/3858; B65D 81/3862; B65D 81/3823; B65D 81/3813; B65D 5/566; B65D 77/042; B65D 1/22; B65D 21/00; B65D 5/56; B65D 81/38; B65D 81/3825;
(Continued)

(56) References Cited

U.S. PATENT DOCUMENTS

| 265,985 A | 10/1882 | Seabury |
| 1,527,167 A | 2/1925 | Birdseye |

(Continued)

FOREIGN PATENT DOCUMENTS

| CA | 2019104 | 12/1991 |
| CN | 206494316 | 9/2017 |

(Continued)

OTHER PUBLICATIONS

US 10,562,676 B2, 02/2020, Waltermire et al. (withdrawn)
(Continued)

*Primary Examiner* — Christopher R Demeree
(74) *Attorney, Agent, or Firm* — Taylor English Duma LLP

(57) ABSTRACT

Disclosed is a box assembly including an exterior piece comprising a middle portion, and an upper portion joined to the middle portion; and an interior piece positioned within the exterior piece, the interior piece defining a cavity and comprising a side panel, the side panel comprising a top interior portion, the side panel and the middle portion of the exterior piece defining a space therebetween, the upper portion of the exterior piece covering the space and the top interior portion of the side panel, and a bottom panel joined to the side panel.

13 Claims, 25 Drawing Sheets

(51) Int. Cl.
  *B65D 5/20* (2006.01)
  *B65D 81/38* (2006.01)
  *B65D 25/02* (2006.01)
  *B31B 50/26* (2017.01)
  *B31B 110/35* (2017.01)

(52) U.S. Cl.
  CPC ........... *B65D 25/02* (2013.01); *B65D 81/386* (2013.01); *B65D 81/3858* (2013.01); *B31B 2110/35* (2017.08)

(58) Field of Classification Search
  CPC ......... F25D 2331/804; F25D 2323/061; B32B 2307/304
  USPC ..... 229/103.11, 122.32, 122.34; 220/592.25, 220/592.2, 592.26, 4.29, 592.23; 206/594, 545; 312/259; 62/60
  See application file for complete search history.

(56) References Cited

U.S. PATENT DOCUMENTS

| | | |
|---|---|---|
| 1,677,565 A | 7/1928 | Oppenheim |
| 1,682,410 A | 8/1928 | Oppenheim |
| 1,747,980 A | 2/1930 | Kondolf |
| 1,753,813 A | 4/1930 | Washburn |
| 1,868,996 A | 7/1932 | Sharp |
| 1,896,393 A | 2/1933 | Devine |
| 1,899,892 A | 2/1933 | D'Este et al. |
| 1,937,263 A | 11/1933 | Bubb |
| 1,942,917 A | 1/1934 | D'Este et al. |
| 1,954,013 A | 4/1934 | Lilienfield |
| 2,018,519 A | 10/1935 | Hall |
| 2,070,747 A | 2/1937 | Ostrom |
| 2,116,513 A | 5/1938 | Frankenstein |
| 2,148,454 A | 2/1939 | Gerard |
| 2,165,327 A | 7/1939 | Zalkind |
| 2,289,060 A | 7/1942 | Merkle |
| 2,293,361 A | 8/1942 | Roberts |
| 2,386,905 A | 10/1945 | Meitzen |
| 2,389,601 A | 11/1945 | De Witt |
| 2,554,004 A | 5/1951 | Bergstein |
| 2,632,311 A | 3/1953 | Sullivan |
| 2,650,016 A | 8/1953 | McMillan |
| 2,753,102 A | 7/1956 | Paige |
| 2,899,103 A | 8/1959 | Ebert |
| 2,927,720 A | 3/1960 | Adams |
| 2,987,239 A | 6/1961 | Atwood |
| 3,029,008 A | 4/1962 | Membrino |
| 3,031,121 A | 4/1962 | Chase |
| 3,065,895 A | 11/1962 | Lipschutz |
| 3,096,879 A | 7/1963 | Schumacher |
| 3,097,782 A | 7/1963 | Koropatkin et al. |
| 3,182,913 A | 5/1965 | Brian |
| 3,193,176 A | 7/1965 | Gullickson et al. |
| 3,222,843 A | 12/1965 | Schneider |
| 3,236,206 A | 2/1966 | Willinger |
| 3,282,411 A | 11/1966 | Jardine |
| 3,286,825 A | 11/1966 | Laas |
| 3,335,941 A | 8/1967 | Gatward |
| 3,371,462 A | 3/1968 | Nordkvist et al. |
| 3,375,934 A | 4/1968 | Bates |
| 3,420,363 A | 1/1969 | Blickensderfer |
| 3,435,736 A | 4/1969 | Reiche |
| 3,503,550 A | 3/1970 | Main et al. |
| 3,551,945 A | 1/1971 | Eyberg et al. |
| 3,703,383 A | 11/1972 | Kuchenbecker |
| 3,734,336 A | 5/1973 | Rankow et al. |
| 3,747,743 A | 7/1973 | Hoffman, Jr. |
| 3,749,299 A | 7/1973 | Ingle |
| 3,836,044 A | 9/1974 | Tilp et al. |
| 3,843,038 A | 10/1974 | Sax |
| 3,880,341 A | 4/1975 | Bamburg et al. |
| 3,890,762 A | 6/1975 | Ernst et al. |
| 3,980,005 A | 9/1976 | Buonaiuto |
| 4,030,227 A | 6/1977 | Oftedahl |
| 4,050,264 A | 9/1977 | Tanaka |
| 4,068,779 A | 1/1978 | Canfield |
| 4,091,852 A | 5/1978 | Jordan et al. |
| 4,169,540 A | 10/1979 | Larsson et al. |
| 4,211,267 A | 7/1980 | Skovgaard |
| 4,213,310 A | 7/1980 | Buss |
| 4,335,844 A | 6/1982 | Egli |
| 4,342,416 A | 8/1982 | Philips |
| 4,380,314 A | 4/1983 | Langston, Jr. et al. |
| 4,396,144 A | 8/1983 | Gutierrez et al. |
| 4,418,864 A | 12/1983 | Neilsen |
| 4,488,623 A | 12/1984 | Linnell, II et al. |
| 4,509,645 A | 4/1985 | Hotta |
| 4,679,242 A | 7/1987 | Brockhaus |
| 4,682,708 A | 7/1987 | Pool |
| 4,819,793 A | 4/1989 | Willard et al. |
| 4,828,133 A | 5/1989 | Hougendobler |
| 4,889,252 A | 12/1989 | Rockom et al. |
| 4,930,903 A | 6/1990 | Mahoney |
| 4,989,780 A | 2/1991 | Foote et al. |
| 5,016,813 A | 5/1991 | Simons |
| 5,020,481 A | 6/1991 | Nelson |
| 5,062,527 A | 11/1991 | Westerman |
| 5,102,004 A | 4/1992 | Hollander et al. |
| 5,154,309 A | 10/1992 | Wischusen, III et al. |
| 5,158,371 A | 10/1992 | Moravek |
| 5,165,583 A | 11/1992 | Kouwenberg |
| 5,263,339 A | 11/1993 | Evans |
| 5,372,429 A | 12/1994 | Beaver, Jr. et al. |
| 5,417,342 A | 5/1995 | Hutchison |
| 5,418,031 A | 5/1995 | English |
| 5,441,170 A | 8/1995 | Bane, III |
| 5,454,471 A | 10/1995 | Norvell |
| 5,491,186 A | 2/1996 | Kean et al. |
| 5,493,874 A | 2/1996 | Landgrebe |
| 5,499,473 A | 3/1996 | Ramberg |
| 5,505,810 A | 4/1996 | Kirby et al. |
| 5,511,667 A | 4/1996 | Carder |
| 5,512,345 A | 4/1996 | Tsutsumi et al. |
| 5,516,580 A | 5/1996 | Frenette et al. |
| 5,562,228 A | 10/1996 | Ericson |
| 5,573,119 A | 11/1996 | Luray |
| 5,596,880 A | 1/1997 | Welker et al. |
| 5,613,610 A | 3/1997 | Bradford |
| 5,615,795 A | 4/1997 | Tipps |
| 5,638,978 A | 6/1997 | Cadiente |
| 5,775,576 A | 7/1998 | Stone |
| 5,842,571 A | 12/1998 | Rausch |
| 5,906,290 A | 5/1999 | Haberkorn |
| 5,996,366 A | 12/1999 | Renard |
| 6,003,719 A | 12/1999 | Steward, III |
| 6,041,958 A | 3/2000 | Tremelo |
| 6,050,412 A | 4/2000 | Clough et al. |
| 6,138,902 A | 10/2000 | Welch |
| 6,164,526 A | 12/2000 | Dalvey |
| 6,168,040 B1 | 1/2001 | Sautner et al. |
| 6,220,473 B1 | 4/2001 | Lehman et al. |
| 6,223,551 B1 | 5/2001 | Mitchell |
| 6,238,091 B1 | 5/2001 | Mogil |
| 6,244,458 B1 | 6/2001 | Frysinger et al. |
| 6,247,328 B1 | 6/2001 | Mogil |
| 6,295,830 B1 | 10/2001 | Newman |
| 6,308,850 B1 | 10/2001 | Coom et al. |
| 6,325,281 B1 | 12/2001 | Grogan |
| 6,443,309 B1 | 9/2002 | Becker |
| 6,453,682 B1 | 9/2002 | Jennings et al. |
| 6,478,268 B1 | 11/2002 | Bidwell et al. |
| 6,510,705 B1 | 1/2003 | Jackson |
| 6,582,124 B2 | 6/2003 | Mogil |
| 6,618,868 B2 | 9/2003 | Minnick |
| 6,688,133 B1 | 2/2004 | Donefrio |
| 6,725,783 B2 | 4/2004 | Sekino |
| 6,726,017 B2 | 4/2004 | Maresh et al. |
| 6,736,309 B1 | 5/2004 | Westerman et al. |
| 6,771,183 B2 | 8/2004 | Hunter |
| 6,821,019 B2 | 11/2004 | Mogil |
| 6,837,420 B2 | 1/2005 | Westerman et al. |
| 6,868,982 B2 | 3/2005 | Gordon |

(56) References Cited

U.S. PATENT DOCUMENTS

| | | | |
|---|---|---|---|
| 6,875,486 B2 | 4/2005 | Miller |
| 6,899,229 B2 | 5/2005 | Dennison et al. |
| 6,910,582 B2 | 6/2005 | Lantz |
| 6,971,539 B1 | 12/2005 | Abbe |
| 7,000,962 B2 | 2/2006 | Le |
| 7,019,271 B2 | 3/2006 | Wnek et al. |
| 7,094,192 B2 | 8/2006 | Schoenberger et al. |
| 7,225,632 B2 | 6/2007 | Derifield |
| 7,225,970 B2 | 6/2007 | Philips |
| 7,229,677 B2 | 6/2007 | Miller |
| 7,264,147 B1 | 9/2007 | Benson et al. |
| 7,392,931 B2 | 7/2008 | Issler |
| 7,452,316 B2 | 11/2008 | Cals et al. |
| D582,676 S | 12/2008 | Rothschild |
| 7,597,209 B2 | 10/2009 | Rothschild et al. |
| 7,677,406 B2 | 3/2010 | Maxson |
| 7,681,405 B2 | 3/2010 | Williams |
| 7,784,301 B2 | 8/2010 | Sasaki et al. |
| 7,807,773 B2 | 10/2010 | Matsuoka et al. |
| 7,841,512 B2 | 11/2010 | Westerman |
| 7,845,508 B2 | 12/2010 | Rothschild et al. |
| 7,870,992 B2 | 1/2011 | Schille et al. |
| 7,909,806 B2 | 3/2011 | Goodman et al. |
| 8,118,177 B2 | 2/2012 | Drapela et al. |
| 8,343,024 B1 | 1/2013 | Contanzo, Jr. et al. |
| 8,365,943 B2 * | 2/2013 | Bentley .............. B65D 81/3823 |
| | | 206/545 |
| 8,465,404 B2 | 6/2013 | Hadley |
| 8,579,183 B2 | 11/2013 | Belfort et al. |
| 8,613,202 B2 | 12/2013 | Williams |
| 8,651,593 B2 | 2/2014 | Bezich et al. |
| 8,763,811 B2 | 7/2014 | Lantz |
| 8,763,886 B2 | 7/2014 | Hall |
| 8,795,470 B2 | 8/2014 | Henderson et al. |
| 8,919,082 B1 | 12/2014 | Cataldo |
| 8,960,528 B2 | 2/2015 | Sadlier |
| 9,272,475 B2 | 3/2016 | Ranade et al. |
| 9,290,313 B2 | 3/2016 | De Lesseux et al. |
| D758,182 S * | 6/2016 | Sponselee ...................... D9/423 |
| 9,408,445 B2 | 8/2016 | Mogil et al. |
| 9,429,350 B2 | 8/2016 | Chapman, Jr. |
| 9,499,294 B1 | 11/2016 | Contanzo, Jr. |
| 9,550,618 B1 | 1/2017 | Jobe |
| 9,605,382 B2 | 3/2017 | Virtanen |
| 9,611,067 B2 | 4/2017 | Collison |
| 9,635,916 B2 | 5/2017 | Bezich et al. |
| 9,738,420 B2 | 8/2017 | Miller |
| 9,738,432 B1 | 8/2017 | Petrucci et al. |
| 9,834,366 B2 | 12/2017 | Giuliani |
| 9,908,684 B2 | 3/2018 | Collison |
| 9,920,517 B2 | 3/2018 | Sollie |
| 9,950,830 B2 | 4/2018 | De Lesseux et al. |
| 9,981,797 B2 | 5/2018 | Aksan et al. |
| 10,046,901 B1 | 8/2018 | Jobe |
| 10,112,756 B2 | 10/2018 | Menzel, Jr. |
| 10,266,332 B2 * | 4/2019 | Aksan ................ B65D 81/3862 |
| 10,442,600 B2 | 10/2019 | Waltermire et al. |
| 10,507,968 B2 | 12/2019 | Sollie et al. |
| 10,551,110 B2 | 2/2020 | Waltermire et al. |
| 10,583,977 B2 | 3/2020 | Collison et al. |
| 2001/0010312 A1 | 8/2001 | Mogil |
| 2002/0020188 A1 | 2/2002 | Sharon et al. |
| 2002/0162767 A1 | 11/2002 | Ohtsubo |
| 2004/0004111 A1 | 1/2004 | Cardinale |
| 2004/0031842 A1 | 2/2004 | Westerman et al. |
| 2004/0079794 A1 | 4/2004 | Mayer |
| 2005/0109655 A1 | 5/2005 | Vershum et al. |
| 2005/0189404 A1 | 9/2005 | Xiaohai et al. |
| 2005/0214512 A1 | 9/2005 | Fascio |
| 2005/0224501 A1 | 10/2005 | Folkert et al. |
| 2005/0279963 A1 | 12/2005 | Church et al. |
| 2006/0053828 A1 | 3/2006 | Shallman et al. |
| 2006/0078720 A1 | 4/2006 | Toas et al. |
| 2006/0096978 A1 | 5/2006 | Lafferty et al. |
| 2006/0193541 A1 | 8/2006 | Norcom |
| 2007/0000932 A1 | 1/2007 | Cron et al. |
| 2007/0000983 A1 | 1/2007 | Spurrell et al. |
| 2007/0051782 A1 | 3/2007 | Lantz |
| 2007/0193298 A1 | 8/2007 | Derifield |
| 2007/0209307 A1 | 9/2007 | Andersen |
| 2007/0257040 A1 | 11/2007 | Price, Jr. et al. |
| 2008/0095959 A1 | 4/2008 | Warner et al. |
| 2008/0135564 A1 | 6/2008 | Romero |
| 2008/0173703 A1 | 7/2008 | Westerman et al. |
| 2008/0190940 A1 | 8/2008 | Scott |
| 2008/0203090 A1 | 8/2008 | Dickinson |
| 2008/0296356 A1 | 12/2008 | Hatcher et al. |
| 2008/0308616 A1 | 12/2008 | Phung |
| 2008/0314794 A1 | 12/2008 | Bowman |
| 2009/0034883 A1 | 2/2009 | Giuliani |
| 2009/0114311 A1 | 5/2009 | McDowell |
| 2009/0193765 A1 | 8/2009 | Lantz |
| 2009/0214142 A1 | 8/2009 | Bossel et al. |
| 2009/0283578 A1 | 11/2009 | Miller |
| 2010/0001056 A1 | 1/2010 | Chandaria |
| 2010/0006630 A1 | 1/2010 | Humphries et al. |
| 2010/0062921 A1 | 3/2010 | Veiseh |
| 2010/0072105 A1 | 3/2010 | Glaser et al. |
| 2010/0139878 A1 | 6/2010 | Nicolucci |
| 2010/0151164 A1 | 6/2010 | Grant et al. |
| 2010/0282827 A1 | 11/2010 | Padovani |
| 2010/0284634 A1 | 11/2010 | Hadley |
| 2010/0314437 A1 | 12/2010 | Dowd |
| 2011/0042449 A1 | 2/2011 | Copenhaver et al. |
| 2011/0100868 A1 | 5/2011 | Lantz |
| 2011/0114513 A1 | 5/2011 | Miller |
| 2011/0235950 A1 | 9/2011 | Lin |
| 2011/0284556 A1 | 11/2011 | Palmer et al. |
| 2011/0311758 A1 | 12/2011 | Burns et al. |
| 2011/0317944 A1 | 12/2011 | Liu |
| 2012/0031957 A1 | 2/2012 | Whitaker |
| 2012/0074823 A1 | 3/2012 | Bezich et al. |
| 2012/0145568 A1 | 6/2012 | Collison et al. |
| 2012/0243808 A1 | 9/2012 | De Lesseux et al. |
| 2012/0248101 A1 | 10/2012 | Tumber et al. |
| 2012/0251818 A1 | 10/2012 | Axrup et al. |
| 2012/0279896 A1 | 11/2012 | Lantz |
| 2013/0112694 A1 | 5/2013 | Bentley |
| 2013/0112695 A1 | 5/2013 | Hall |
| 2013/0140317 A1 | 6/2013 | Roskoss |
| 2014/0000306 A1 | 1/2014 | Chapman, Jr. |
| 2014/0021208 A1 | 1/2014 | Anti et al. |
| 2014/0093697 A1 | 4/2014 | Perry et al. |
| 2014/0248003 A1 | 9/2014 | Mogil et al. |
| 2014/0319018 A1 | 10/2014 | Collison |
| 2014/0367393 A1 | 12/2014 | Ranade |
| 2015/0110423 A1 | 4/2015 | Fox et al. |
| 2015/0166244 A1 | 6/2015 | Wood et al. |
| 2015/0175338 A1 | 6/2015 | Culp et al. |
| 2015/0238033 A1 | 8/2015 | Zavitsanos |
| 2015/0239639 A1 | 8/2015 | Wenner et al. |
| 2015/0259126 A1 | 9/2015 | McGoff et al. |
| 2015/0345853 A1 | 12/2015 | Oeyen |
| 2016/0015039 A1 | 1/2016 | Pierce |
| 2016/0052696 A1 | 2/2016 | Cook et al. |
| 2016/0060017 A1 | 3/2016 | De Lesseux et al. |
| 2016/0304267 A1 | 10/2016 | Aksan |
| 2016/0325915 A1 | 11/2016 | Aksan |
| 2017/0015080 A1 | 1/2017 | Collison et al. |
| 2017/0043937 A1 | 2/2017 | Lantz |
| 2017/0198959 A1 | 7/2017 | Morris |
| 2017/0225870 A1 | 8/2017 | Collison |
| 2017/0233134 A9 | 8/2017 | Grajales et al. |
| 2017/0283157 A1 | 10/2017 | Jobe |
| 2017/0305639 A1 | 10/2017 | Kuhn et al. |
| 2017/0320653 A1 | 11/2017 | Mogil et al. |
| 2017/0334622 A1 | 11/2017 | Menzel, Jr. |
| 2017/0341847 A1 | 11/2017 | Chase et al. |
| 2017/0369226 A1 | 12/2017 | Chase et al. |
| 2018/0050857 A1 | 2/2018 | Collison |
| 2018/0051460 A1 | 2/2018 | Sollie et al. |
| 2018/0148246 A1 | 5/2018 | Fu et al. |
| 2018/0194534 A1 | 7/2018 | Jobe |
| 2018/0215525 A1 | 8/2018 | Vogel et al. |

(56) References Cited

U.S. PATENT DOCUMENTS

| | | |
|---|---|---|
| 2018/0229917 A1 | 8/2018 | Jobe |
| 2018/0237207 A1 | 8/2018 | Aksan et al. |
| 2018/0274837 A1 | 9/2018 | Christensen |
| 2018/0290813 A1 | 10/2018 | Waltermire et al. |
| 2018/0290815 A1 | 10/2018 | Waltermire et al. |
| 2018/0299059 A1 | 10/2018 | McGoff et al. |
| 2018/0327171 A1 | 11/2018 | Waltermire et al. |
| 2018/0327172 A1 | 11/2018 | Waltermire et al. |
| 2018/0334308 A1 | 11/2018 | Moore et al. |
| 2018/0335241 A1 | 11/2018 | Li et al. |
| 2019/0032991 A1* | 1/2019 | Waltermire ............. F25D 23/06 |
| 2019/0047775 A1 | 2/2019 | Waltermire et al. |
| 2019/0185246 A1 | 6/2019 | Sollie et al. |
| 2019/0185247 A1 | 6/2019 | Sollie et al. |
| 2019/0193916 A1 | 6/2019 | Waltermire et al. |
| 2019/0210790 A1 | 7/2019 | Rizzo et al. |
| 2019/0234679 A1 | 8/2019 | Waltermire et al. |
| 2019/0248573 A1 | 8/2019 | Collison et al. |
| 2019/0270572 A1 | 9/2019 | Collison et al. |
| 2019/0270573 A1 | 9/2019 | Collison et al. |
| 2019/0352075 A1 | 11/2019 | Waltermire et al. |
| 2019/0352076 A1 | 11/2019 | Waltermire et al. |
| 2019/0352080 A1 | 11/2019 | Waltermire et al. |
| 2019/0359412 A1 | 11/2019 | Sollie et al. |
| 2019/0359413 A1 | 11/2019 | Sollie et al. |
| 2019/0359414 A1 | 11/2019 | Sollie et al. |
| 2019/0367209 A1 | 12/2019 | Jobe |
| 2019/0376636 A1 | 12/2019 | Fellinger et al. |
| 2019/0382186 A1 | 12/2019 | Sollie et al. |
| 2019/0390892 A1 | 12/2019 | Waltermire et al. |
| 2020/0088458 A1 | 3/2020 | Waltermire et al. |
| 2020/0103159 A1 | 4/2020 | Waltermire et al. |
| 2020/0122896 A1 | 4/2020 | Waltermire et al. |
| 2020/0148410 A1 | 5/2020 | Sollie et al. |
| 2020/0148453 A1 | 5/2020 | Sollie et al. |

FOREIGN PATENT DOCUMENTS

| | | |
|---|---|---|
| CN | 108001787 | 5/2018 |
| DE | 1897846 | 7/1964 |
| DE | 102011016500 | 10/2012 |
| DE | 202017103230 | 7/2017 |
| EP | 0133539 | 2/1985 |
| EP | 0537058 | 4/1993 |
| EP | 2990196 | 3/2016 |
| FR | 1241878 | 9/1960 |
| FR | 2705317 | 11/1994 |
| FR | 2820718 | 8/2002 |
| FR | 2821786 | 9/2002 |
| FR | 3016352 | 7/2015 |
| GB | 235673 | 6/1925 |
| GB | 528289 | 1/1940 |
| GB | 713640 | 8/1954 |
| GB | 1204058 | 9/1970 |
| GB | 1372054 | 10/1974 |
| GB | 2400096 | 5/2006 |
| GB | 2516490 | 1/2015 |
| JP | 01254557 | 10/1989 |
| JP | 2005139582 | 6/2005 |
| JP | 2005247329 | 9/2005 |
| JP | 2012126440 | 7/2012 |
| WO | 8807476 | 10/1988 |
| WO | 9726192 | 7/1997 |
| WO | 9932374 | 7/1999 |
| WO | 2001070592 | 9/2001 |
| WO | 2014147425 | 9/2014 |
| WO | 2016187435 A2 | 5/2016 |
| WO | 2016187435 A3 | 11/2016 |
| WO | 2018089365 | 5/2018 |
| WO | 2018093586 | 5/2018 |
| WO | 2018227047 | 12/2018 |
| WO | 2019125904 | 6/2019 |
| WO | 2019125906 | 6/2019 |
| WO | 2019226199 | 11/2019 |
| WO | 2020101939 | 5/2020 |
| WO | 2020102023 | 5/2020 |
| WO | 2020122921 | 6/2020 |

OTHER PUBLICATIONS

Waltermire, Jamie; Supplemental Notice of Allowance for U.S. Appl. No. 15/482,200, filed Apr. 7, 2017, dated Jul. 26, 2019, 9 pgs.

Waltermire, Jamie; Supplemental Notice of Allowance for U.S. Appl. No. 15/482,200, filed Apr. 7, 2017, dated Aug. 12, 2019, 7 pgs.

Collison, Alan B.; Corrected Notice of Allowance for U.S. Appl. No. 15/677,738, filed Aug. 15, 2017, dated Jan. 15, 2019, 7 pgs.

Periwrap; Article entitled: "Insulated Solutions", located at <https://www.peri-wrap.com/insulation/>, accessed on Dec. 3, 2018, 9 pgs.

Waltermire, Jamie; Requirement for Restriction/Election for U.S. Appl. No. 15/482,186, filed Apr. 7, 2017, dated Apr. 17, 2019, 7 pgs.

Waltermire, Jamie; Final Office Action for U.S. Appl. No. 15/482,200, filed Apr. 7, 2017, dated Jan. 2, 2019, 23 pgs.

Waltermire, Jamie; Non-Final Office Action for U.S. Appl. No. 15/482,200, filed Apr. 7, 2017, dated Jun. 11, 2018, 36 pgs.

Waltermire, Jamie; Final Office Action for U.S. Appl. No. 15/590,345, filed May 9, 2017, dated Mar. 19, 2019, 42 pgs.

Waltermire, Jamie; Non-Final Office Action for U.S. Appl. No. 15/590,345, filed May 9, 2017, dated Aug. 24, 2018, 41 pgs.

Waltermire, Jamie; Non-Final Office Action for U.S. Appl. No. 15/590,349, filed May 9, 2017, dated Nov. 5, 2018, 41 pgs.

Waltermire, Jamie; Requirement for Restriction/Election for U.S. Appl. No. 15/590,349, filed May 9, 2017, dated Aug. 30, 2018, 10 pgs.

Waltermire, Jamie; Requirement for Restriction/Election for U.S. Appl. No. 15/663,905, filed Jul. 31, 2017, dated Mar. 21, 2019, 8 pgs.

Sollie, Greg; Non-Final Office Action for U.S. Appl. No. 15/845,545, filed Dec. 18, 2017, dated Mar. 5, 2019, 41 pgs.

Sollie, Greg; Non-Final Office Action for U.S. Appl. No. 15/845,540, filed Dec. 18, 2017, dated Apr. 2, 2019, 50 pgs.

Collison, Alan B.; Applicant Interview Summary for U.S. Appl. No. 15/677,738, filed Aug. 15, 2017, dated Dec. 5, 2018, 4 pgs.

Collison, Alan B.; Applicant Interview Summary for U.S. Appl. No. 15/677,738, filed Aug. 15, 2017, dated Apr. 22, 2019, 4 pgs.

Collison, Alan B.; Final Office Action for U.S. Appl. No. 15/677,738, filed Aug. 15, 2017, dated Feb. 28, 2019, 14 pgs.

Collison, Alan B.; Non-Final Office Action for U.S. Appl. No. 15/677,738, filed Aug. 15, 2017, dated Oct. 23, 2018, 11 pgs.

Collison, Alan B.; Requirement for Restriction/Election for U.S. Appl. No. 15/677,738, filed Aug. 15, 2017, dated Jul. 31, 2018, 8 pgs.

Cellulose Material Solutions, LLC; Brochure for Infinity Care Thermal Liner, accessed on Oct. 22, 2018, 2 pgs.

Uline; Article entitled: Corrugated Corner Protectors—4x4", accessed on Oct. 25, 2018, 1 pg.

DHL Express; Brochure for Dry Ice Shipping Guidelines, accessed on Oct. 26, 2018, 12 pgs.

Thomas Scientific; Article entitled: "Thermosafe: Test Tube Shipper/Rack", accessed on Oct. 26, 2018, 2 pgs.

Stinson, Elizabeth; Article entitled: "A Pizza Geek Discovers the World's Smartest Pizza Box", published Jan. 17, 2014, 8 pgs.

Collison, Alan B.; Requirement for Restriction/Election for U.S. Appl. No. 15/677,738, filed Aug. 15, 2017, dated Jul. 3, 2018, 8 pgs.

Waltermire, Jamie; International Search Report and Written Opinion for PCT Application No. PCT/US18/65464, filed Dec. 13, 2018, dated Mar. 11, 2019, 9 pgs.

Sollie, Greg; International Search Report and Written Opinion for PCT Application No. PCT/US18/65461, filed Dec. 13, 2018, dated Mar. 21, 2019, 13 pgs.

Sollie, Greg; International Search Report and Written Opinion for PCT/US18/65463, filed Dec. 13, 2018, dated Mar. 25, 2019, 11 pgs.

American Bag Company; Article entitled: "Cool Green Bag, Small", located at <http://hotcoldbags.com/items/Cool%20Green%20Bag,%20Small>, accessed on Mar. 20, 2017, 2 pgs.

(56) References Cited

OTHER PUBLICATIONS

Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Waltermire, Jamie; Notice of Allowance for U.S. Appl. No. 15/482,200, filed Apr. 7, 2017, dated May 14, 2019, 25 pgs.
Waltermire, Jamie; Final Office Action for U.S. Appl. No. 15/590,349, filed May 9, 2017, dated May 9, 2019, 31 pgs.
Waltermire, Jamie; Non-Final Office Action for U.S. Appl. No. 15/663,905, filed Jul. 31, 2017, dated Jun. 25, 2019, 66 pgs.
Sollie, Greg; Notice of Allowance for U.S. Appl. No. 15/845,545, filed Dec. 18, 2017, dated Jun. 19, 2019, 20 pgs.
Collison, Alan B.; Notice of Allowance for U.S. Appl. No. 15/677,738, filed Aug. 15, 2017, dated Jun. 19, 2019, 10 pgs.
Sollie, Greg; Non-Final Office Action for U.S. Appl. No. 15/988,550, filed May 24, 2018, dated May 29, 2019, 48 pgs.
Sollie, Greg; Non-Final Office Action for U.S. Appl. No. 16/280,595, filed Feb. 20, 2019, dated May 29, 2019, 60 pgs.
Sollie, Greg; International Search Report and Written Opinion for PCT Application No. PCT/US18/65459, filed Dec. 13, 2018, dated May 1, 2019, 15 pgs.
Voluntary Standard for Repulping and Recycling Corrugated Fiberboard Treated to Improve Its Performance in the Presence of Water and Water Vapor. (revises Aug. 16, 2013) Fibre Box Association (FBA), Elk Grove Village, IL, 1-23, Retrieved from http://www.corrugated.org/wp-content/uploads/PDFs/Recycling/Vol_Std_Protocol_2013. pdf, 23 pgs.
MP Global Products, LLC; International Search Report and Written Opinion of the International Searching Authority for PCT/US2017/060403, filed Nov. 7, 2017, dated Feb. 19, 2018, 15 pgs.
MP Global Products; Article entitled: "Thermopod mailer envelopes and Thermokeeper insulated box liners", located at < http://www.mhpn.com/product/thermopod_mailer_envelopes_and_thermokeeper_insulated_box_liners/packaging>, accessed on Aug. 30, 2017, 2 pgs.
Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.
Periwrap; Article entitled: "Insulated Solutions", located at <https://www.peri-wrap.com/insulation/>, accessed on Dec. 3, 2018, 5 pgs.
Salazar Packaging; Article entitle: "Custom Packaging and Design", located at <https://salazarpackaging.com/custom-packaging-and-design/>, accessed on Sep. 28, 2017, 2 pgs.
Singh, et al; Article entitled: "Performance Comparison of Thermal Insulated Packaging Boxes, Bags and Refrigerants for Single-parcel Shipments", published Mar. 13, 2007, 19 pgs.
Tera-Pak; Article entitled: "Insulated Shipping Containers", located at <http://www.tera-pak.com/>, accessed on Mar. 20, 2017, 3 pgs.
Un Packaging; Article entitled: "CooLiner ® Insulated Shipping Bags", available at <http://www.chem-tran.com/packaging/supplies/cooliner-insulated-shipping-bags.php>, accessed on Aug. 30, 2017, 2 pgs.
Weiku.com; Article entitled: "100% Biodegradable Packing materials Green Cell Foam Stock Coolers", located at <http://www.weiku.com/products/18248504/100_Biodegradable_Packing_materials_Green_Cell_Foam_Stock_Coolers.html>, accessed on Sep. 28, 2017, 7 pgs.
Duro Bag; Article entitled: "The Load and Fold Bag", accessed on May 24, 2017, copyrighted Apr. 2017, 3 pgs.
Greenblue; "Environmental Technical Briefs of Common Packaging Materials- Fiber-Based Materials", Sustainable Packaging Solution, 2009, 19 pgs.
Images of Novolex bag, including an outer paper bag, a corrugated cardboard insert, and an inner foil-covered bubble-wrap bag, publicly available prior to May 9, 2017, 7 pgs.
Waltermire, Jamie; Corrected Notice of Allowance for U.S. Appl. No. 15/590,345, filed May 9, 2017, dated Feb. 18, 2020, 9 pgs.
Waltermire, Jamie; Supplemental Notice of Allowance for U.S. Appl. No. 15/590,345, filed May 9, 2017, dated Jan. 9, 2020, 8 pgs.
Waltermire, Jamie; Requirement for Restriction/Election for U.S. Appl. No. 16/526,555, filed Jul. 30, 2019, dated Jan. 17, 2020, 7 pgs.
Sollie, Greg; Non-Final Office Action for U.S. Appl. No. 15/845,540, filed Dec. 18, 2017, dated Feb. 19, 2020, 32 pgs.
Sollie, Greg; Applicant-Initiated Interview Summary for U.S. Appl. No. 16/530,052, filed Aug. 2, 2019, dated Feb. 5, 2020, 2 pgs.
Sollie, Greg; Requirement for Restriction/Election for U.S. Appl. No. 16/401,603, filed May 2, 2019, dated Feb. 18, 2020, 6 pgs.
Sollie, Greg; International Search Report and Written Opinion for PCT Application No. PCT/US19/60486, filed Nov. 18, 2019, dated Jan. 13, 2020, 10 pgs.
Sollie, Greg; Invitation to Pay Additional Fees for PCT/US19/59764, filed Nov. 5, 2019, dated Jan. 2, 2020, 2 pgs.
Sollie, Greg; Final Office Action for U.S. Appl. No. 16/408,981, filed May 10, 2019, dated Feb. 24, 2020, 29 pgs.
Waltermire, Jamie; Non-Final Office Action for U.S. Appl. No. 16/526,511, filed Jul. 30, 2019, dated Dec. 9, 2019, 55 pgs.
Waltermire, Jamie; Non-Final Office Action for U.S. Appl. No. 16/530,045, filed Aug. 2, 2019, dated Dec. 20, 2019, 61 pgs.
Waltermire, Jamie; Supplemental Notice of Allowance for U.S. Appl. No. 15/590,345, filed May 9, 2017, dated Dec. 3, 2019, 14 pgs.
Waltermire, Jamie; Applicant-Initiated Interview Summary for U.S. Appl. No. 15/590,349, filed May 9, 2017, dated Dec. 3, 2019, 3 pgs.
Waltermire, Jamie; Final Office Action for U.S. Appl. No. 15/590,349, filed May 9, 2017, dated Jan. 6, 2020, 26 pgs.
Waltermire, Jamie; Corrected Notice of Allowance for U.S. Appl. No. 15/663,905, filed Jul. 31, 2017, dated Nov. 18, 2019, 6 pgs.
Waltermire, Jamie; Corrected Notice of Allowance for U.S. Appl. No. 15/663,905, filed Jul. 31, 2017, dated Dec. 26, 2019, 7 pgs.
Waltermire, Jamie; Notice of Allowance for U.S. Appl. No. 15/663,905, filed Jul. 31, 2017, dated Nov. 4, 2019, 18 pgs.
Waltermire, Jamie; Final Office Action for U.S. Appl. No. 16/381,678, filed Apr. 11, 2019, dated Dec. 30, 2019, 17 pgs.
Sollie, Greg; Corrected Notice of Allowance for U.S. Appl. No. 15/845,545, filed Dec. 18, 2017, dated Oct. 31, 2019, 12 pgs.
Sollie, Greg; Final Office Action for U.S. Appl. No. 15/845,540, filed Dec. 18, 2017, dated Oct. 30, 2019, 56 pgs.
Collison, Alan B.; Notice of Allowance for U.S. Appl. No. 15/677,738, filed Aug. 15, 2017, dated Oct. 29, 2019, 14 pgs.
Collison, Alan B.; Supplemental Notice of Allowance for U.S. Appl. No. 15/677,738, filed Aug. 15, 2017, dated Dec. 10, 2019, 4 pgs.
Sollie, Greg; Applicant Initiated Interview Summary for U.S. Appl. No. 15/988,550, filed May 24, 2018, dated Dec. 27, 2019, 3 pgs.
Sollie, Greg; Non-Final Office Action for U.S. Appl. No. 16/280,595, filed Feb. 20, 2019, dated Dec. 19, 2019, 23 pgs.
Sollie, Greg; Final Office Action for U.S. Appl. No. 16/530,052, filed Aug. 2, 2019, dated Dec. 27, 2019, 49 pgs.
Sollie, Greg; Non-Final Office Action for U.S. Appl. No. 16/567,192, filed Sep. 11, 2019, dated Dec. 10, 2019, 49 pgs.
Waltermire, Jamie; Non-Final Office Action for U.S. Appl. No. 15/482,186, filed Apr. 7, 2017, dated Aug. 20, 2019, 81 pgs.
Waltermire, Jamie; Supplemental Notice of Allowance for U.S. Appl. No. 15/482,200, filed Apr. 7, 2017, dated Sep. 10, 2019, 8 pgs.
Waltermire, Jamie; Notice of Allowance for U.S. Appl. No. 15/590,345, filed May 19, 2017, dated Oct. 1, 2019, 28 pgs.
Waltermire, Jamie; Non-Final Office Action for U.S. Appl. No. 15/590,349, filed May 9, 2017, dated Sep. 5, 2019, 25 pgs.
Waltermire, Jamie; Final Office Action for U.S. Appl. No. 15/663,905, filed Jul. 31, 2017, dated Aug. 22, 2019, 23 pgs.
Waltermire, Jamie; Non-Final Office Action for U.S. Appl. No. 16/381,678, filed Apr. 11, 2019, dated Sep. 9, 2019, 50 pgs.
Sollie, Greg; Corrected Notice of Allowance for U.S. Appl. No. 15/845,545, filed Dec. 18, 2017, dated Oct. 1, 2019, 7 pgs.
"Green Cell Foam Shipping Coolers", located at <https://www.greencellfoam.com/shipping-coolers>, accessed on Oct. 18, 2019, 4 pgs.
CooLiner ® Insulated Shipping Bags, available at <http://www/chem-tran.com/packaging/supplies/cooliner-insulated-shipping-bags.php>, accessed on Oct. 18, 2019, 4 pgs.
Sollie, Greg; Final Office Action for U.S. Appl. No. 15/988,550, filed May 24, 2018, dated Aug. 14, 2019, 19 pgs.

(56) References Cited

OTHER PUBLICATIONS

Sollie, Greg; Non-Final Office Action for U.S. Appl. No. 15/988,550, filed May 24, 2018, dated Oct. 9, 2019, 17 pgs.
Sollie, Greg; Final Office Action for U.S. Appl. No. 16/280,595, filed Feb. 20, 2019, dated Oct. 3, 2019, 19 pgs.
Sollie, Greg; Non-Final Office Action for U.S. Appl. No. 16/530,052, filed Aug. 2, 2019, dated Oct. 2, 2019, 12 pgs.
Sollie, Greg; Non-Final Office Action for U.S. Appl. No. 16/408,981, filed May 10, 2019, dated Aug. 20, 2019, 60 pgs.
Waltermire, Jamie; Notice of Allowance for U.S. Appl. No. 15/482,186, filed Apr. 7, 2017, dated Mar. 5, 2020, 29 pgs.
Waltermire, Jamie; Non-Final Office Action for U.S. Appl. No. 16/293,716, filed Mar. 6, 2019, dated Jun. 5, 2020, 70 pgs.
Waltermire, Jamie; Requirement for Restriction/Election for U.S. Appl. No. 16/293,716, filed Mar. 6, 2019, dated Feb. 26, 2020, 6 pgs.
Waltermire, Jamie; Non-Final Office Action for U.S. Appl. No. 16/526,555, filed Jul. 30, 2019, dated Apr. 2, 2020, 63 pgs.
Waltermire, Jamie; Advisory Action for U.S. Appl. No. 16/381,678, filed Apr. 11, 2019, dated Feb. 26, 2020, 3 pgs.
Waltermire, Jamie; Non-Final Office Action for U.S. Appl. No. 16/381,678, filed Apr. 11, 2019, dated Apr. 17, 2020, 30 pgs.
Waltermire, Jamie; Non-Final Office Action for U.S. Appl. No. 16/561,203, filed Sep. 5, 2019, dated Jun. 6, 2020, 59 pgs.
Waltermire, Jamie; Requirement for Restriction/Election for U.S. Appl. No. 16/561,203, filed Sep. 5, 2019, dated Feb. 26, 2020, 5 pgs.
Sollie, Greg; Restriction Requirement for U.S. Appl. No. 16/552,277, filed Aug. 27, 2019, dated Apr. 20, 2020, 7 pgs.
Sollie, Greg; Non-Final Office Action for U.S. Appl. No. 15/988,550, filed May 24, 2018, dated Mar. 11, 2020, 35 pgs.
Sollie, Greg; Applicant-Initiated Interview Summary for U.S. Appl. No. 16/280,595, filed Feb. 20, 2019 dated May 6, 2020, 3 pgs.
Sollie, Greg; Final Office Action for U.S. Appl. No. 16/280,595, filed Feb. 20, 2019, dated Mar. 24, 2020, 20 pgs.
Sollie, Greg; Non-Final Office Action for U.S. Appl. No. 16/530,052, filed Aug. 2, 2019, dated Mar. 3, 2020, 24 pgs.
Sollie, Greg; Non-Final Office Action for U.S. Appl. No. 16/401,603, filed May 2, 2019, dated Mar. 10, 2020, 67 pgs.
Waltermire, Jamie; Corrected Notice of Allowance for U.S. Appl. No. 15/482,186, filed Apr. 7, 2017, dated Jun. 2, 2020, 10 pgs.
Waltermire, Jamie; Applicant-Initiated Interview Summary for U.S. Appl. No. 16/526,511, filed Jul. 30, 2019, dated Jun. 12, 2020, 5 pgs.
Waltermire, Jamie; Final Office Action for U.S. Appl. No. 16/526,511, filed Jul. 30, 2019, dated May 19, 2020, 39 pgs.
Waltermire, Jamie; Applicant-Initiated Interview Summary for U.S. Appl. No. 16/530,045, filed Mar. 2, 2019, dated Jun. 15, 2020, 3 pgs.
Waltermire, Jamie; Non-Final Office Action for U.S. Appl. No. 16/530,045, filed Aug. 2, 2019, dated May 27, 2020, 38 pgs.
Waltermire, Jamie; Non-Final Office Action for U.S. Appl. No. 15/590,349, filed May 9, 2017, dated Mar. 12, 2020, 30 pgs.
Waltermire, Jamie; Final Office Action for U.S. Appl. No. 16/381,678, filed Apr. 11, 2019, dated Mar. 16, 2020, 8 pgs.
Sollie, Greg; Non-Final Office Action for U.S. Appl. No. 16/552,277, filed Aug. 27, 2019, dated Jun. 3, 2020, 38 pgs.
Collison, Alan B.; Requirement for Restriction/Election for U.S. Appl. No. 16/414,309, filed May 16, 2019, dated Jun. 16, 2020, 5 pgs.
Sollie, Greg; Final Office Action for U.S. Appl. No. 16/567,192, filed Sep. 11, 2019, dated Jun. 8, 2020, 20 pgs.
Sollie, Greg; Applicant-Initiated Interview Summary for U.S. Appl. No. 16/401,603, filed May. 2, 2019, dated May 15, 2020, 3 pgs.
Sollie, Greg; Final Office Action for U.S. Appl. No. 16/401,603, filed May 2, 2019, dated Jun. 30, 2020, 13 pgs.
Sollie, Greg; International Preliminary Report on Patentability for PCT Application No. PCT/US18/65461, filed Dec. 13, 2018, dated Jul. 2, 2020, 12 pgs.
Sollie, Greg; International Preliminary Report on Patentability for PCT Application No. PCT/US18/65459, filed Dec. 13, 2018, dated Jul. 2, 2020, 11 pgs.
Sollie, Greg; Advisory Action for U.S. Appl. No. 16/280,595, filed Feb. 20, 2019, dated Jul. 6, 2020, 3 pgs.
Sollie, Greg; International Search Report and Written Opinion for PCT Application No. PCT/US20/24820, filed Mar. 26, 2020, dated Jul. 2, 2020, 14 pgs.
Sollie, Greg; International Search Report and Written Opinion for PCT Application No. PCT/US19/59764, filed Nov. 5, 2019, dated Jul. 1, 2020, 13 pgs.

* cited by examiner

INSULATED BOX ASSEMBLY WITH OVERLAPPING PANELS

CROSS-REFERENCE TO RELATED APPLICATIONS

This application claims the benefit of U.S. Provisional Application No. 62/760,672, filed on Nov. 13, 2018, which is hereby incorporated by reference herein in its entirety.

JOINT RESEARCH AGREEMENT

The subject matter disclosed was developed and the claimed invention was made by, or on behalf of, one or more parties to a joint research agreement between MP Global Products LLC of Norfolk, Nebr. and Pratt Retail Specialties, LLC of Conyers, Ga., that was in effect on or before the effective filing date of the claimed invention, and the claimed invention was made as a result of activities undertaken within the scope of the joint research agreement.

TECHNICAL FIELD

This disclosure relates to foldable boxes. More specifically, this disclosure relates to insulated foldable boxes.

BACKGROUND

Home delivery of food is becoming more common as the process becomes more efficient and costs go down. Delivery boxes may alternatively need to keep the food hot or cold enough to, for example, prevent bacterial growth, prevent melting or congealing of the food, or simply maintain the edibility, texture, and flavor of the food. Another consideration for the type of box to use is its impact on the environment, as it relates to the reusability and recyclability of the boxes. Polystyrene foam boxes are prevalent in the food-delivery industry because of their low cost, but they are not commonly recycled. Thus, they take up a disproportionate volume of landfill space.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts off the disclosure as an introduction to the following complete and extensive detailed description.

Disclosed is a box assembly comprising: an exterior piece comprising a middle portion, and an upper portion joined to the middle portion; an interior piece positioned within the exterior piece, the interior piece defining a cavity and comprising a side panel, the side panel comprising a top interior portion, the side panel and the middle portion of the exterior piece defining a space therebetween, the upper portion of the exterior piece covering the space and the top interior portion of the side panel; and a bottom panel joined to the side panel.

Also disclosed is a method of assembling a box assembly, the method comprising: folding an exterior piece from a flat configuration to a three-dimensional configuration defining a cavity, the exterior piece comprising a plurality of middle portions and a plurality of upper portions joined to the middle portions by fold lines; folding an interior piece from a flat configuration to a three-dimensional configuration defining a cavity, the interior piece comprising a bottom panel and a plurality of side panels; inserting the interior piece into the exterior piece to define a space between the middle portions of the exterior piece and the side panels of the interior piece; and folding the upper portions of the exterior piece to cover the space.

Also disclosed is a blank for an interior piece of a box assembly, the blank comprising: a bottom panel; and four side panels joined to the bottom panel by fold lines, each side panel separated from an adjacent side panel by a side panel cut.

Also disclosed is a box assembly comprising: an exterior piece; an interior piece positioned within the exterior piece and comprising a side panel; and a bottom panel joined to the side panel.

Also disclosed is a method of assembling a box assembly, the method comprising: folding an exterior piece from a flat configuration to a three-dimensional configuration defining a cavity; folding an interior piece from a flat configuration to a three-dimensional configuration defining a cavity; and inserting the interior piece into the exterior piece to define a space between the middle portions of the exterior piece and the side panels of the interior piece.

Also disclosed is a blank for an interior piece of a box assembly, the blank comprising: a bottom panel; and four side panels joined to the bottom panel.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
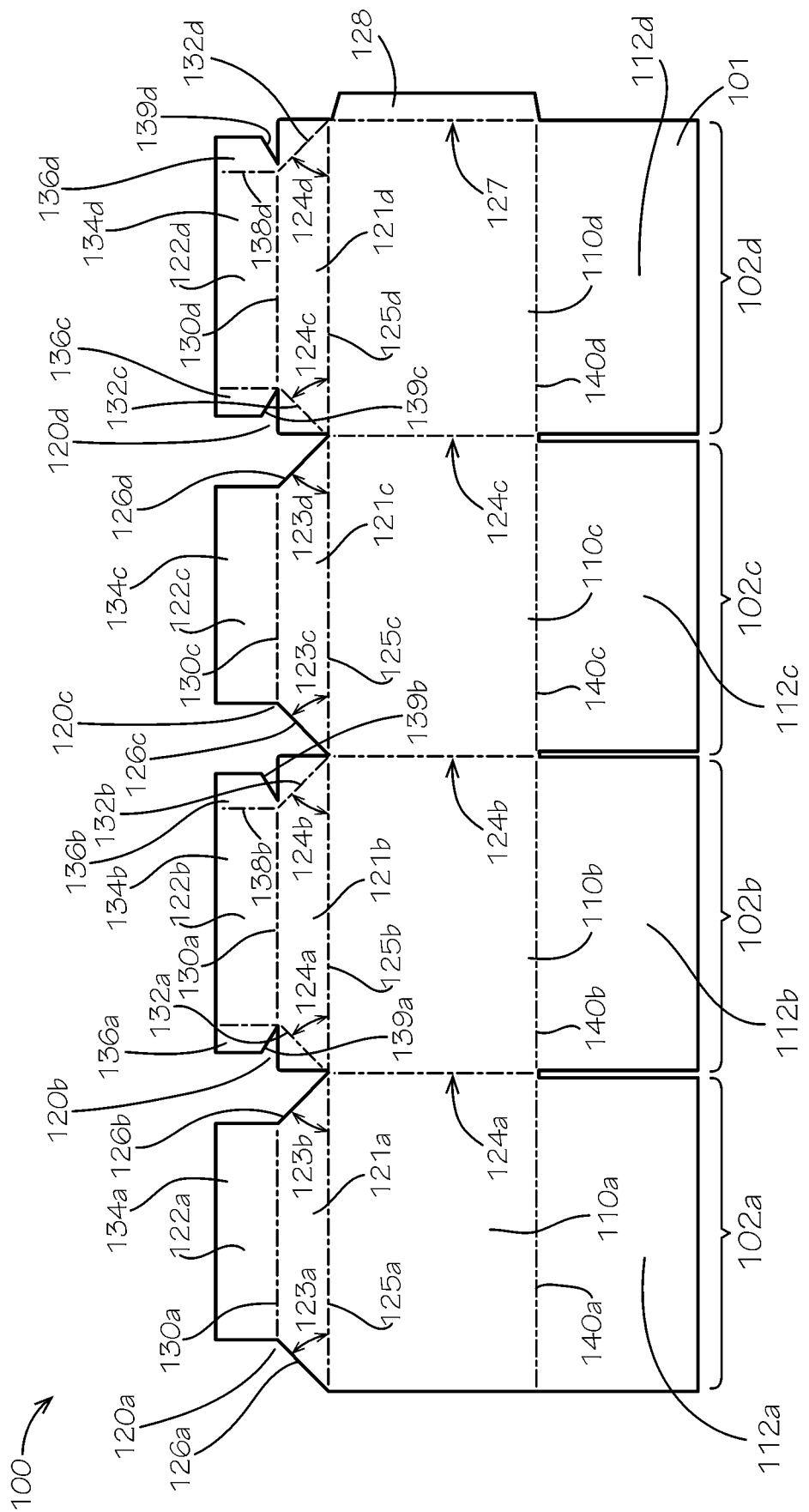
FIG. 1 shows a blank configured to be assembled into an exterior piece of an insulated box in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

FIG. 1 shows in one exemplary aspect an exterior piece 100 of an insulated box 2400 (shown in FIG. 25) in an unassembled configuration as a blank. As shown, the exterior piece 100 can comprise four subpanels 102a,b,c,d. Each subpanel can comprise a middle portion 110a,b,c,d, an upper portion 120a,b,c,d, and a lower portion 112a,b,c,d. The middle portions 110a,b,c,d can be joined by fold lines 124a,b,c. A side strip 128 can be joined to the fourth middle portion 110d by a fold line 127. The exterior piece 100 as a blank can define a planar first exterior surface 101, with a similar planar second exterior surface (not shown) opposite from the exterior surface 101.

Each middle portion 110a,b,c,d can be joined to an upper portion 120a,b,c,d by a fold line 125a,b,c,d. Each upper portion can comprise a connecting segment 121a,b,c,d and an end segment 122a,b,c,d. The end segments 122a,b,c,d can be joined to the connecting segments 121a,b,c,d by fold lines 130a,b,c,d.

The connecting segments 121a,c can be of various shapes, including rectangles, parallelograms, and trapezoids. In the current aspect, a first connecting segment 121a and a third connecting segment 121c can be trapezoidal in shape. The legs 126a,b,c,d of the first and third connecting segments 121a,c can form angles 123a,b,c,d with the fold lines 125a,b,c,d. The angles 123a,b,c,d can be about 45 degrees. A second and a fourth connecting segment 121b,d can be substantially rectangular and can comprise or define crease lines 132a,b,c,d.

Each end segment 122a,b,c,d can comprise a middle tab 134a,b,c,d and a side tab 136a,b,c,d. In the current aspect, the second and fourth end segments 122b,d can each comprise two side tabs 136a,b,c,d. The side tabs 136a,b,c,d can be joined to the middle tabs 134a,b,c,d by fold lines 138a, b,c,d. Each side tab can comprise a bottom edge 139a,b,c,d, and each bottom edge 139a,b,c,d can form an angle with the fold lines 138a,b,c,d. The lower portions 112a,b,c,d can be joined to the middle portions 110a,b,c,d by fold lines 140a, b,c,d.

Figure 2:
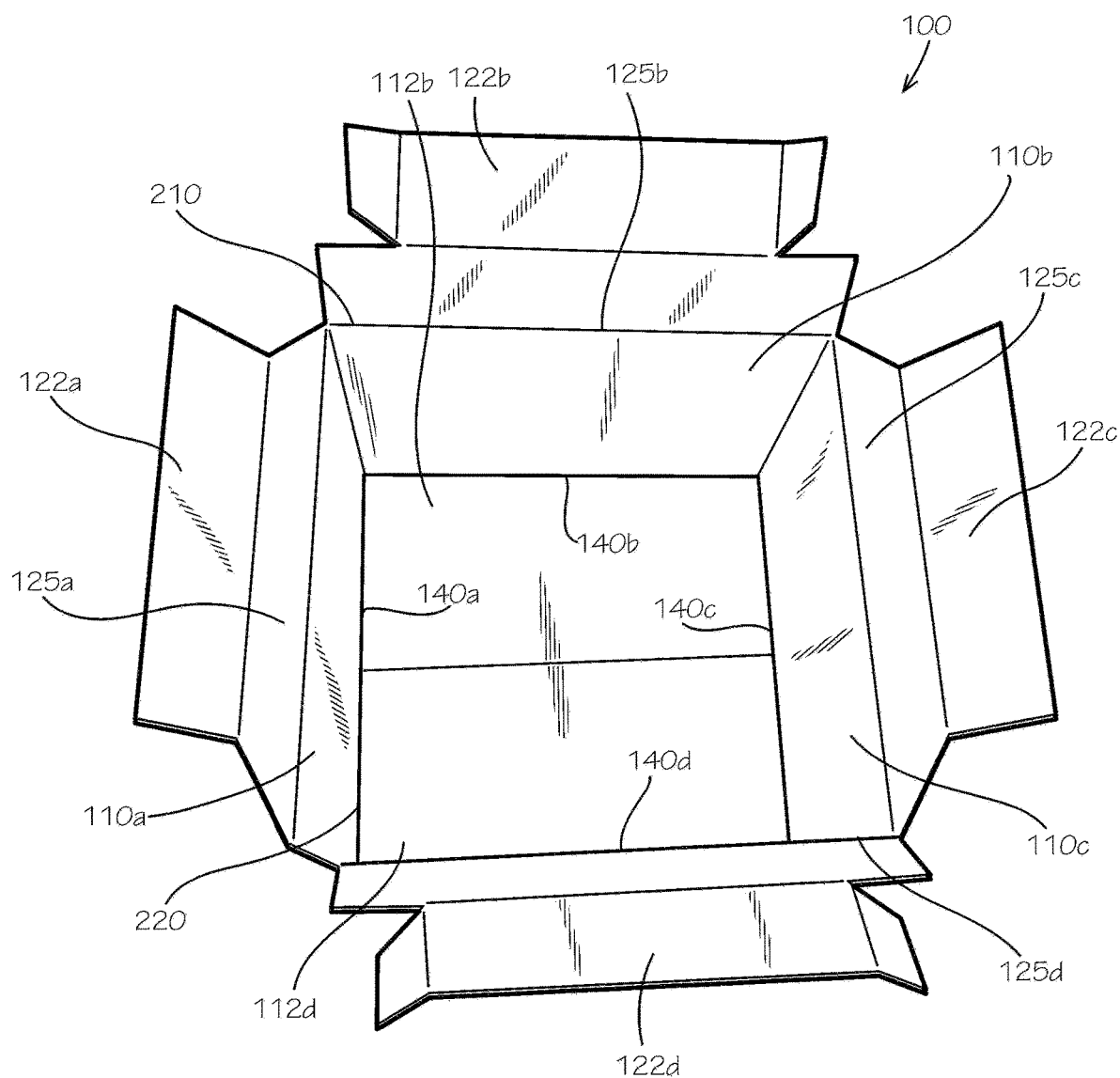
FIG. 2 is a perspective view of the exterior piece of the insulated box assembled from the blank of FIG. 1.

FIG. 2 is a perspective view of the exterior piece 100 in an assembled configuration. The fold lines 140a,b,c,d joining the middle portions 110a,b,c,d to the upper portions 120a,b,c,d can form a top outside edge 210. The fold lines 140a,b,c,d joining the middle portions 110a,b,c,d to the lower portions 112a,b,c,d can form a bottom outside edge 220. The side strip 128 can be affixed to the first subpanel 102a by staples, hot melt glue, or other adhesives known in the art, or with no adhesive at all.

Figure 3:
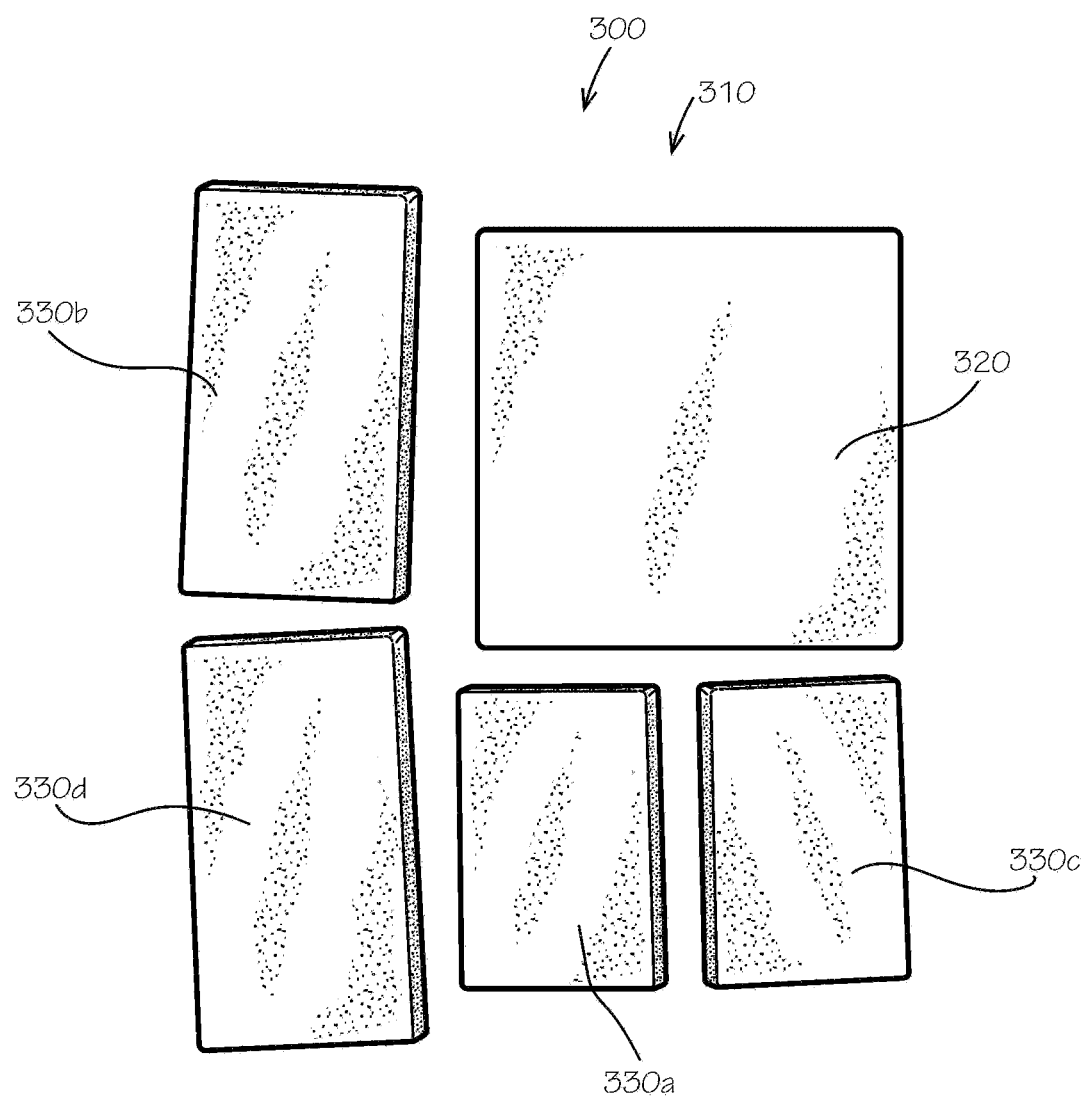
FIG. 3 shows a side view of insulator pads configured to be placed between an interior piece of the insulated box and the exterior piece, according to another aspect of the present disclosure.

FIG. 3 shows an exemplary aspect of an insulator 300 that can be used in the insulated box 2400. The insulator 300 can form a loose fill (not shown) or another configuration known in the art. In the current aspect, the insulator 300 can comprise insulator pads 310. The insulator pads 310 can comprise a variety of materials known in the art, such as polystyrene and/or cellulose. The insulator pads 310 can comprise a bottom insulator 320 and side insulators 330a, b,c,d. The side insulators 330a,b,c,d can comprise a first, second, third, and fourth side insulator 330a,b,c,d, respectively. The first and third side insulators 330a,c can be shorter than the second and fourth side insulators 330b,d. The side insulators can also comprise a single insulator pad (not shown) extending circumferentially around an interior piece 500.

The insulator pads 310 can comprise paper or other paper fiber materials; however, in other aspects, the insulation batts can comprise cotton, foam, rubber, plastics, fiberglass, mineral wool, or any other flexible insulation material. In the present application, the insulation batts can be repulpable. In the present aspect, the insulated box 2400 can be 100% recyclable. In the present aspect, the insulated box 2400 can be single-stream recyclable wherein all materials comprised by the insulated box 2400 can be recycled by a single processing train without requiring separation of any materials or components of the insulated box 2400. In the present aspect, the insulated box 2400 can be compostable. In the present aspect, the insulated box 2400 can be repulpable. In the present aspect, the insulated box 2400 and the insulator pads 310 can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. which is hereby incorporated in its entirety. In the present aspect, the insulated box 2400 and the insulator pads 310 can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill.

Recyclable and repulpable insulation materials are further described in U.S. patent application Ser. No. 15/677,738, filed Aug. 15, 2017, U.S. Provisional Patent Application No. 62/375,555, filed Aug. 16, 2016, U.S. Provisional Patent Application No. 62/419,894, filed Nov. 9, 2016, and U.S. Provisional Patent Application No. 62/437,365, filed Dec. 21, 2016, which are each incorporated by reference in their entirety herein.

Figure 4:
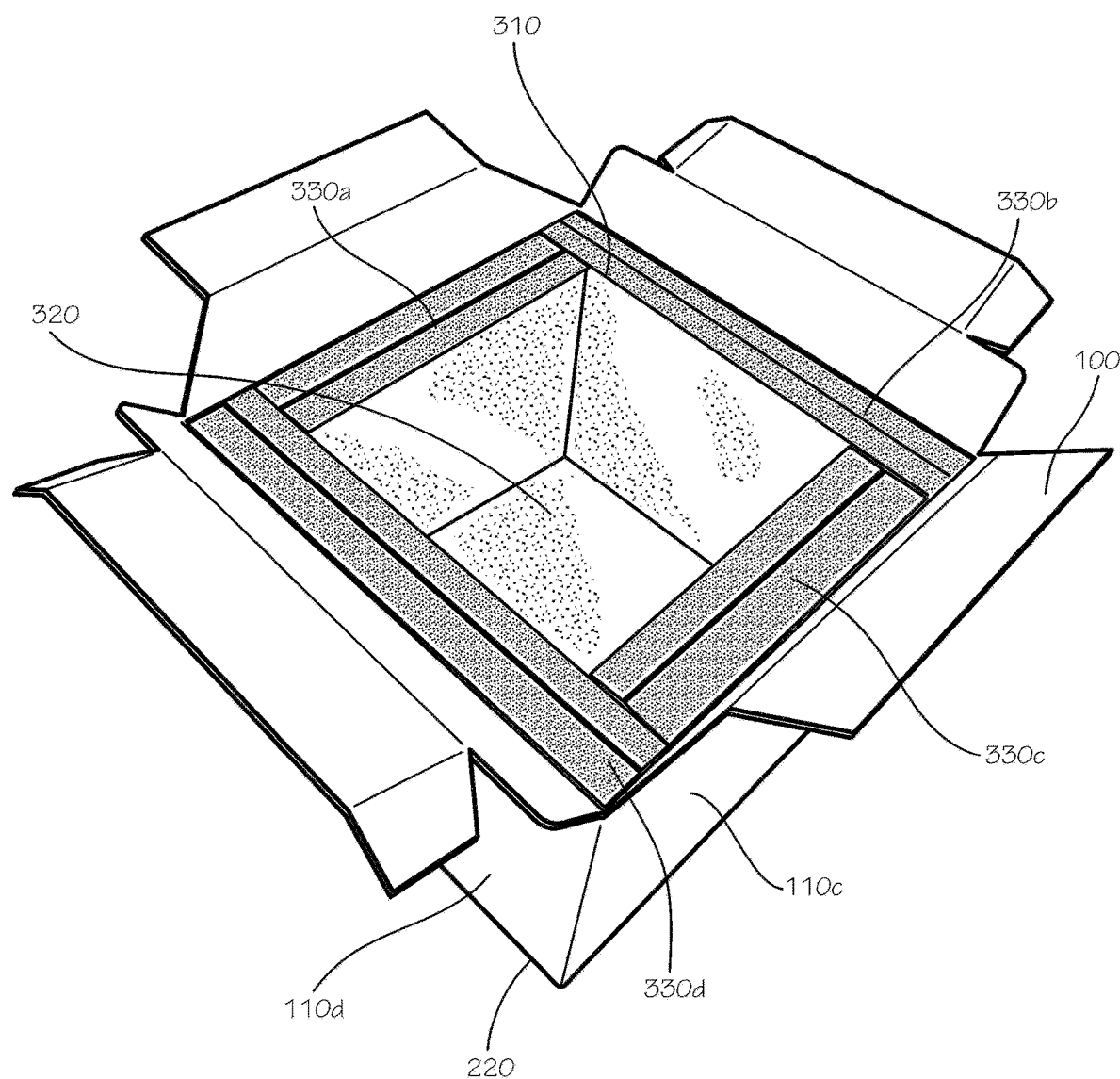
FIG. 4 is a perspective view of the insulator pads placed inside the exterior piece.

FIG. 4 is a perspective view of the partially assembled insulated box 2400. The insulator pads 310 are placed inside the assembled exterior piece 100. The bottom insulator 320 can cover, or proximately face, the lower portions 112a,b,c,d (not shown) of the exterior piece 100. The bottom insulator 320 can fully extend to the bottom outside edge 220. The side insulators 330a,b,c,d can alternate shorter and longer. For example, in the current aspect, the first side insulator 330a can be configured to proximately face the first middle portion 110a (not shown). Likewise, the second, third, and fourth side insulators 330bc,d, respectively, can be configured to face the corresponding numbered middle portions 110b,c,d.

Figure 5:
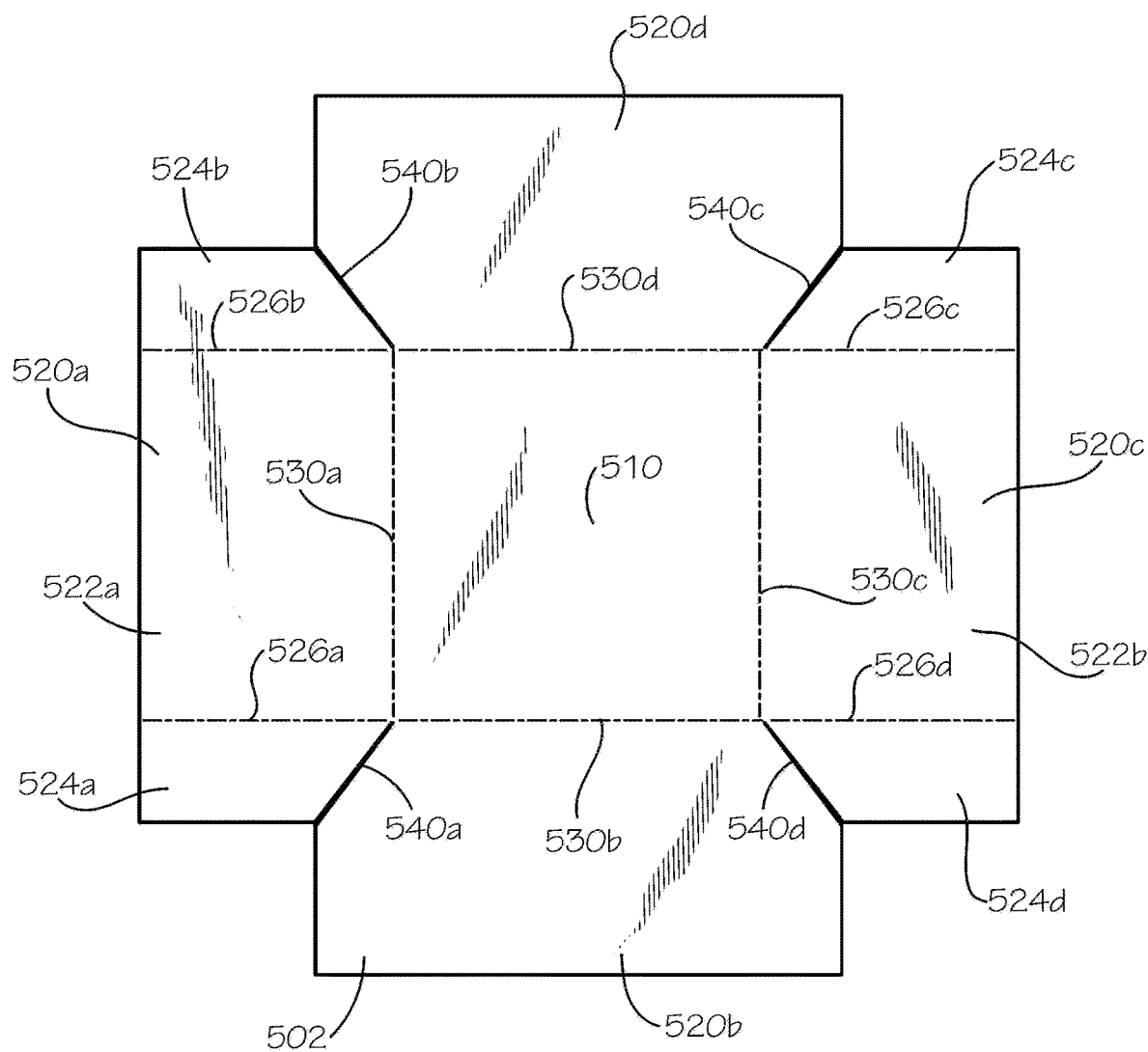
FIG. 5 shows a blank configured to be assembled into the interior piece of the insulated box.

FIG. 5 shows the interior piece 500 of the insulated box 2400 in an unassembled configuration. The interior piece 500 can comprise a bottom panel 510, side panels 520a,b, c,d, and fold lines 530a,b,c,d joining the bottom panel 510 to the side panels 520a,b,c,d. An interior surface 502 faces out of the page in FIG. 5. Alternating side panels—for example, a first and a third side panel 520a,c—can comprise a middle tab 522a,b and a side tab 524a,b,c,d. The middle tabs 522a,b can be joined to the side tabs 524a,b,c,d by fold lines 526a,b,c,d. A second and a fourth side panel 520b,d can lack fold lines. The interior piece 500 can be formed from a single flat piece with side panel cuts 540a,b,c,d separating the side panels 520a,b,c,d from each other. Thus, a blank of the interior piece 500 can be configured such that each side panel 520a,b,c,d is not connected to any other side panel 520a,b,c,d, except only indirectly through the bottom panel 510. The side panel cuts 540a,b,c,d can form angles with the fold lines 526a,b,c,d, the angles being approximately 45 degrees.

Figure 6:
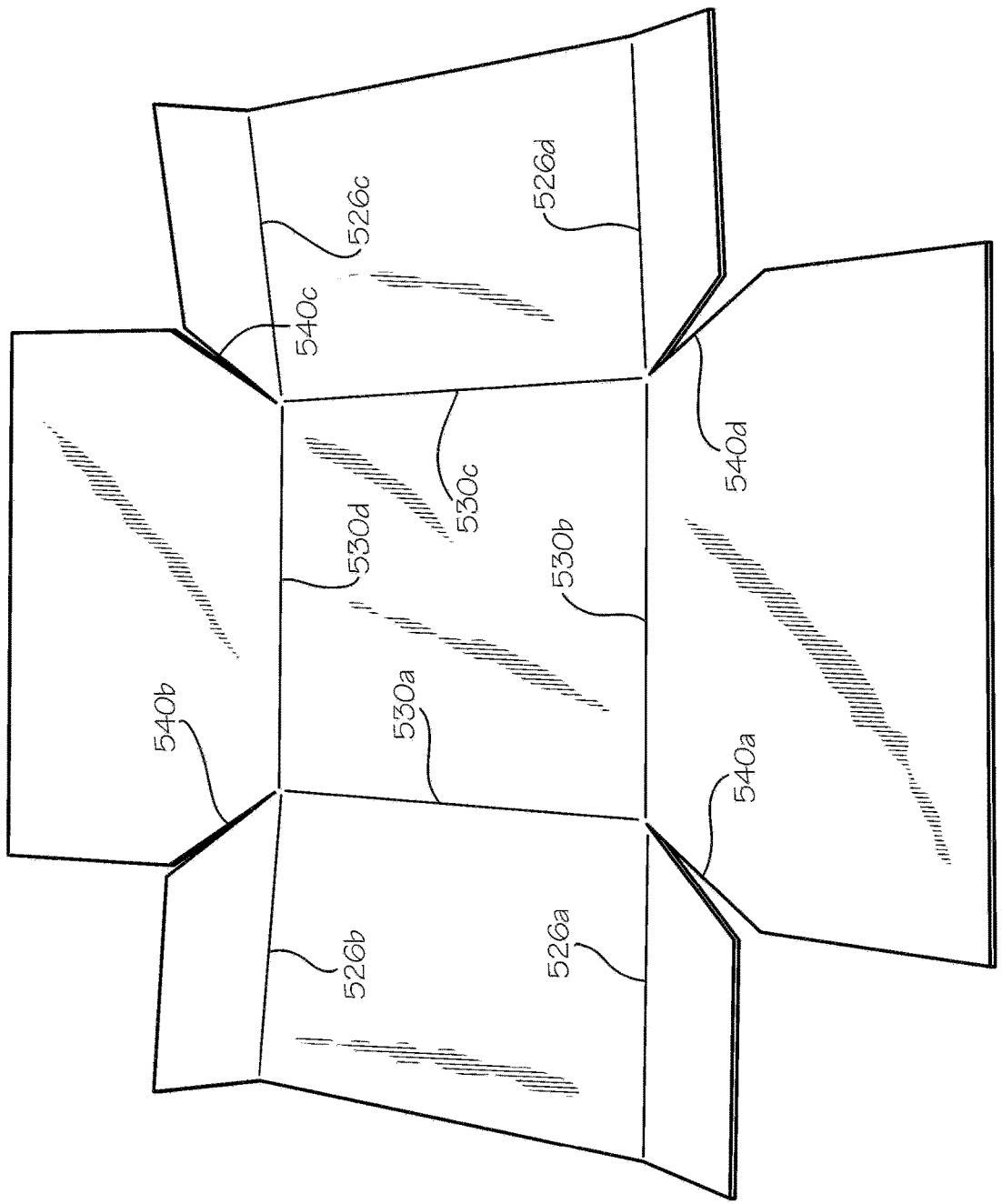
FIG. 6 is a perspective view of the blank of FIG. 5 with flaps of the blank slightly folded up.

FIG. 6 is a perspective view of the interior piece 500 with the fold lines 530a,b,c,d; 526a,b,c,d in a slightly bent configuration.

Figure 7:
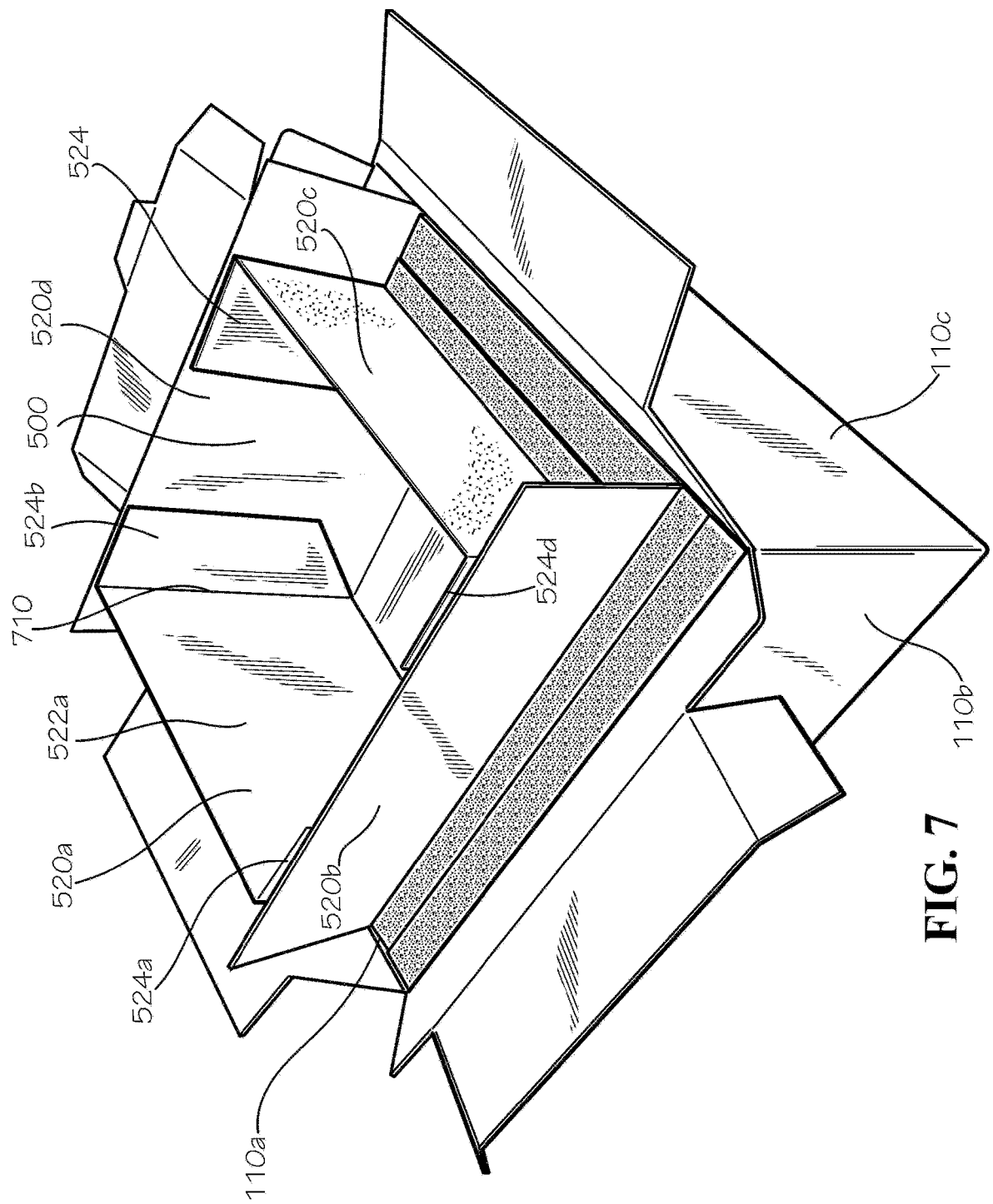
FIG. 7 is a perspective view of the interior piece positioned into the exterior piece with the insulator pads of FIG. 4 positioned therebetween.

FIG. 7 is a perspective view of the interior piece 500 partially inside the partially assembled box of FIG. 4. The middle tab 522a of the first side panel 520a of the interior piece 500 can be configured to proximately face the first middle portion 110a of the exterior piece 100. Likewise, the second, third, and fourth side panels 520b,c,d of the interior piece 500 can face the corresponding middle portions 110b, c,d of the exterior piece 100. Alternating side panels—for example, the second and fourth side panels 520b,d—can be configured to extend completely between the second and fourth middle portions 110b,d of the exterior piece 100. The side tabs 524a,b,c,d of the side panels 520a,c can be configured to fold inwards toward a cavity 710 in the insulated box 2400.

Figure 8:
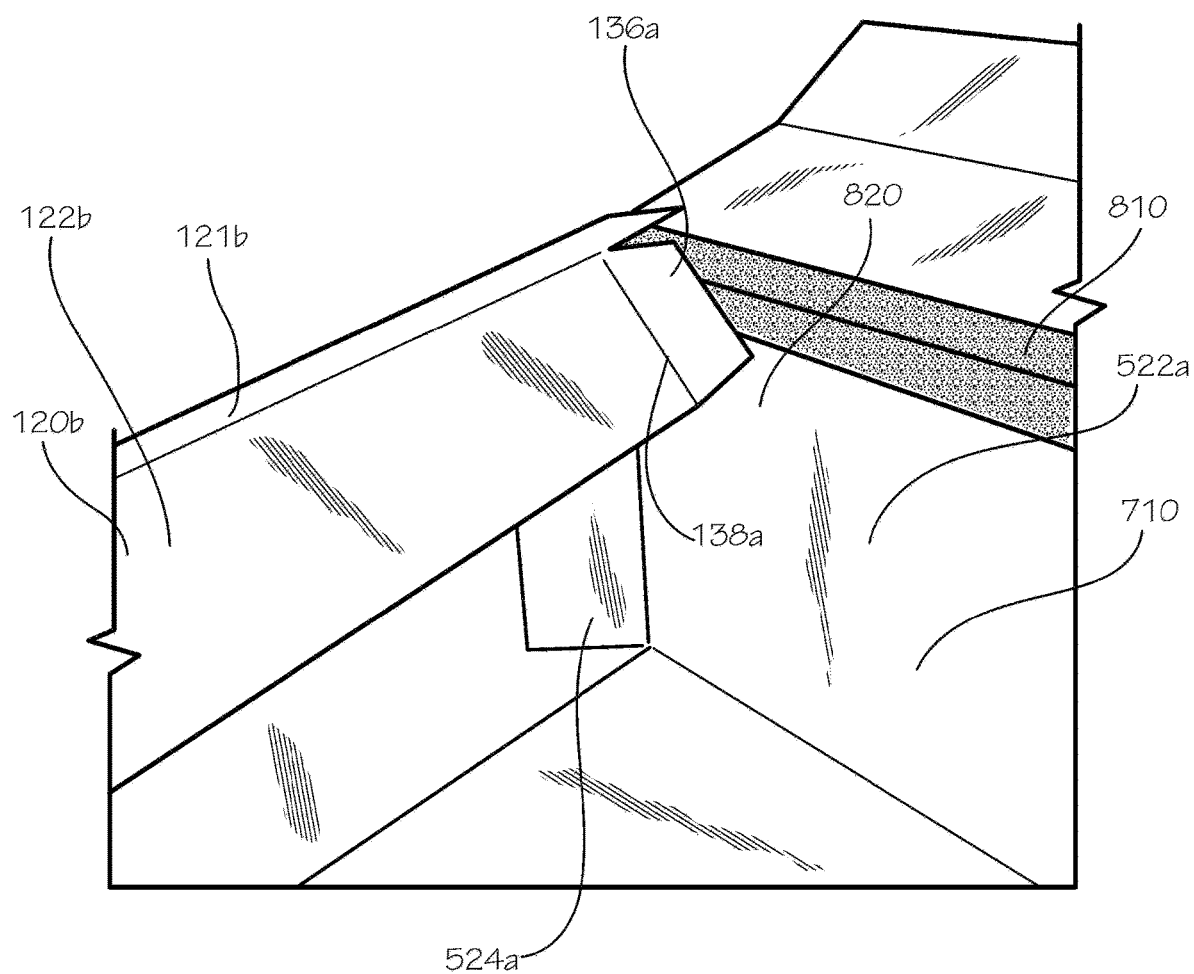
FIG. 8 is a perspective view of a top interior corner of the interior piece, with an upper portion of the exterior piece folded over to overlap a top edge of the interior piece.

FIG. 8 is a perspective view of the partially assembled insulated box 2400, showing a close-up of one of the exterior piece's 100 upper portions 120b (of the exterior piece 100) comprising an end segment 122b comprising a side tab 136a. The connecting segment can be configured to fold down toward the cavity 710 and cover a top edge 810 of the insulating pads 310. In other aspects (not shown) in accordance with the present disclosure, the insulator pads can be omitted, in which case the insulating properties of air left behind in a space or gap left between the interior piece 500 and the exterior piece 100 can insulate the insulated box 2400. In yet other aspects, at least a portion of the upper portion 120a,b,c,d of the exterior piece 100—not necessarily the connecting segment 121a,c—can cover at least some portion of the space. In other words, "covering" can comprise "partially covering."

The end segment 122b can be configured to overlap or cover a top interior portion 820 of the assembled interior piece 500. In some aspects, only a portion of the top interior portion 820 may be covered by a portion of the upper portion 120a,b,c,d of the exterior piece 100. The side tab 136a can overlap the side panel adjoining the side panel overlapped by the end segment 122b, which in this aspect can be side panel 520a.

Figure 9:
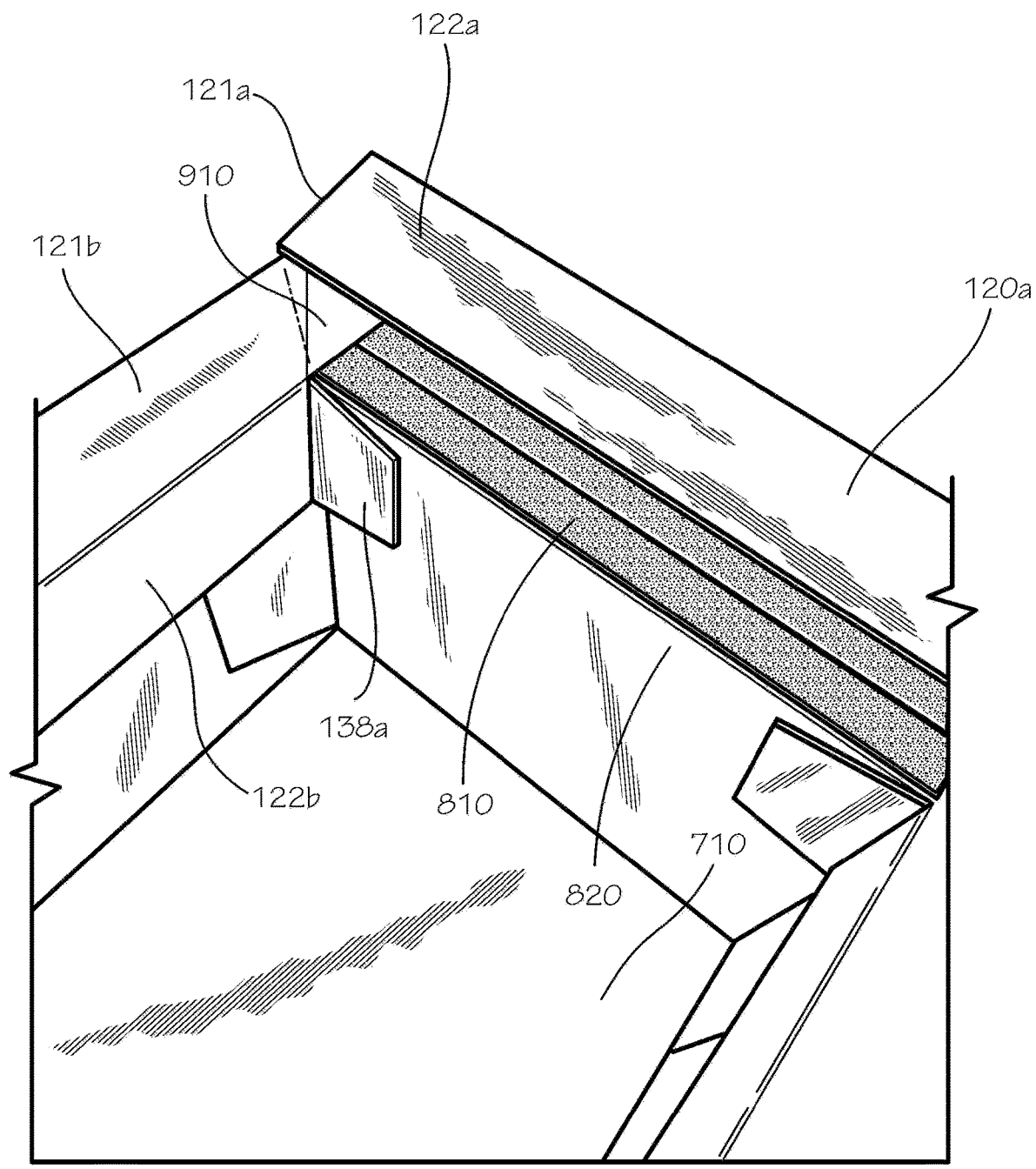
FIG. 9 is a perspective view of the partially assembled insulated box, with another upper portion of the exterior piece in the process of being folded over to overlap the top edge of the interior piece.

FIG. 9 is a perspective view of the partially assembled insulated box 2400, showing the next step in assembly after FIG. 8. The upper portion 120a can be configured to fold down toward the cavity 710. The connecting segment 121a can overlap a corner 910 of the adjoining connecting segment. The end segment 122a can overlap the top interior portion 820 of the interior piece 500 and further overlap the side tab 136a of the exterior piece 100. The end segments 122a can be affixed in place by adhesives known in the art or by friction without adhesive.

Figure 10:
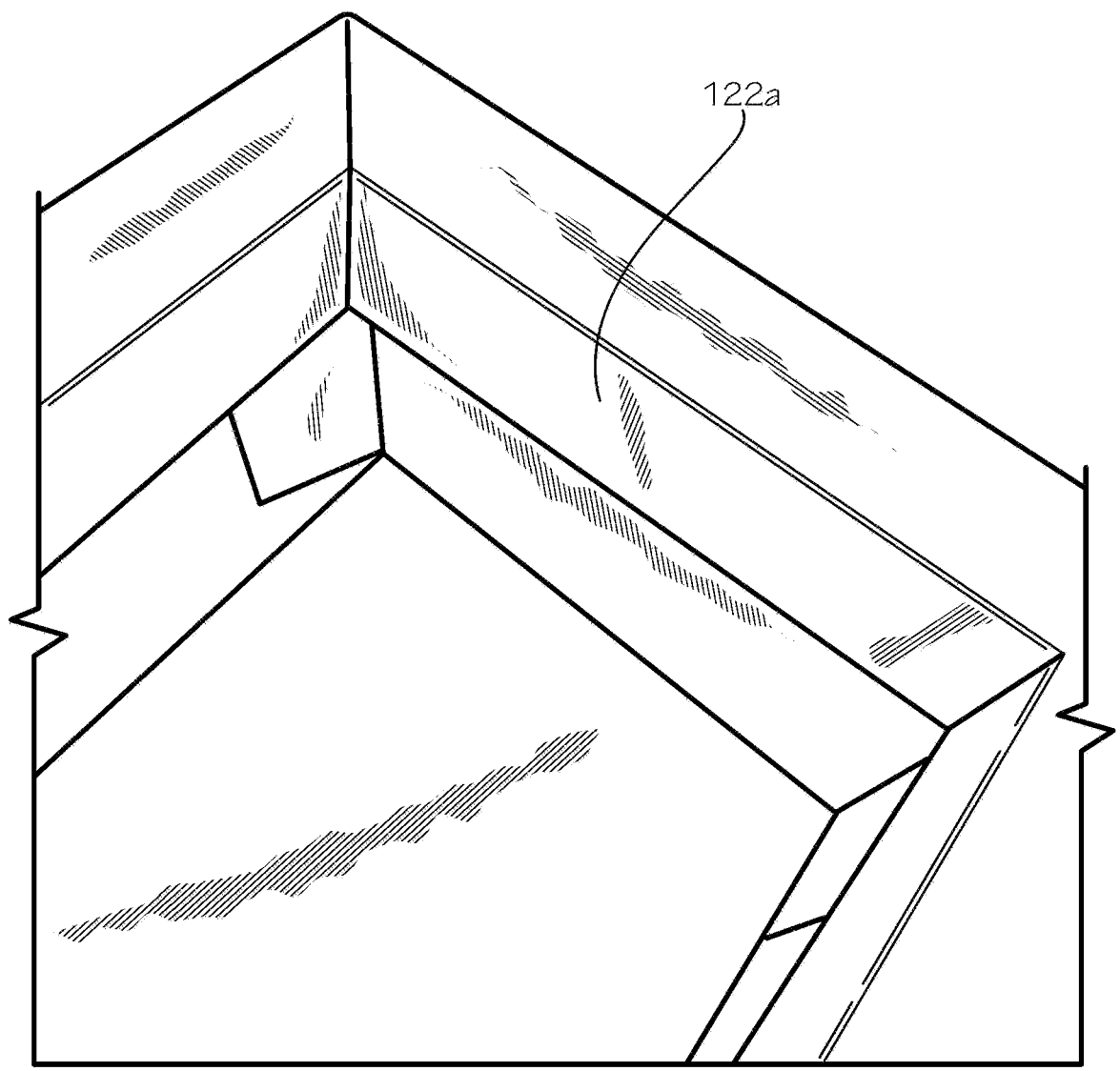
FIG. 10 is a perspective view of the insulated box after another upper portion of the exterior piece has been folded over to overlap the top edge of the interior piece.

FIG. 10 shows the insulated box 2400 after the step shown in FIG. 9 has been completed. The end segment 122a overlaps side panel 520a and side tab 136a of the exterior piece 100.

Figure 11:
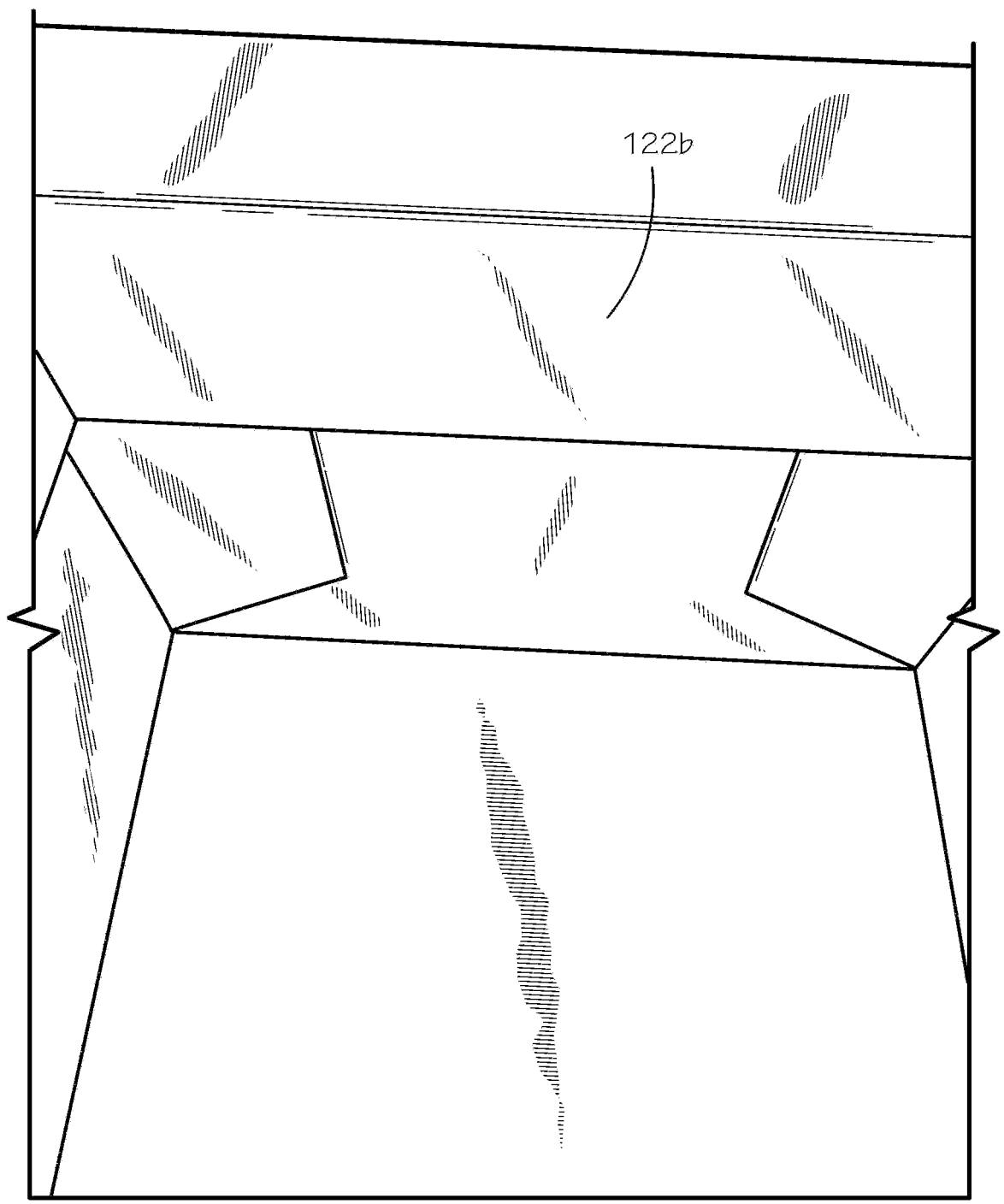
FIG. 11 is a perspective view of an interior of the insulated box with the upper portions of the exterior piece folded over and overlapping side panels of the interior piece.

FIG. 11 shows another view of the insulated box 2400, particularly a close-up of end segment 122b.

Figure 12:
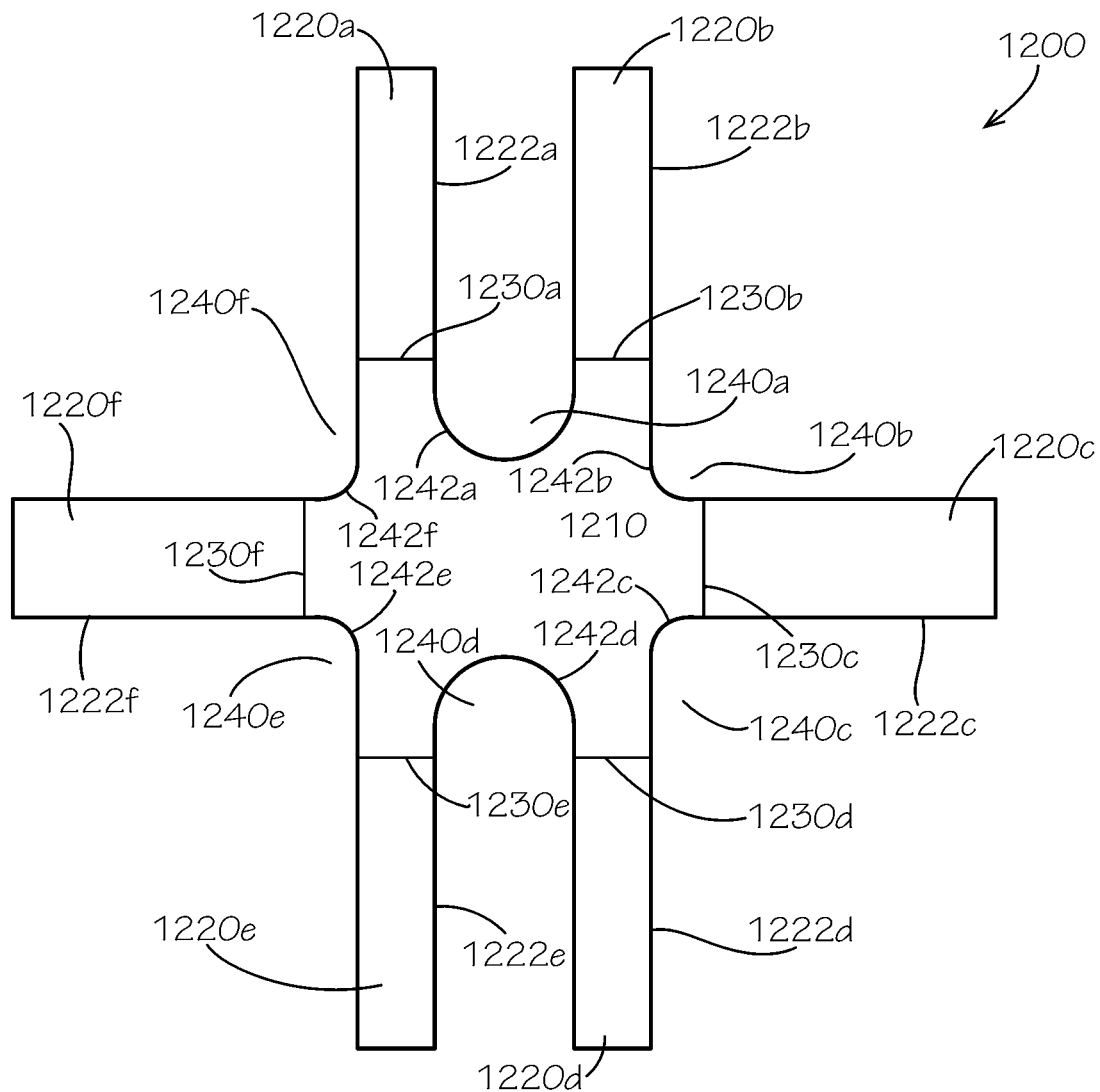
FIG. 12 shows a blank configured to be assembled into a box insert with vertical rails in accordance with another aspect of the present disclosure.

FIG. 12 is a top view of a box insert 1200 with vertical rails 1220 in a flat configuration. The box insert 1200 can comprise a center segment 1210 and vertical rails 1220a,b, c,d,e,f joined thereto by fold lines 1230a,b,c,d,e,f. The center segment 1210 can comprise cutouts 1240a,b,c,d,e,f. An edge 1242a,b,c,d,e,f of each cutout 1240a,b,c,d,e,f can be contiguous with an edge 1222a,b,c,d,e,f of each vertical rail 1220a,b,c,d,e,f, respectively. The edges 1242a,b,c,d,e,f of the cutouts 1240a,b,c,d,e,f can be curvilinear, rectilinear, or some other shape. The edges 1222a,b,c,d,e,f of the vertical rails 1220a,b,c,d,e,f can be curvilinear or rectilinear or some other shape.

Figure 13:
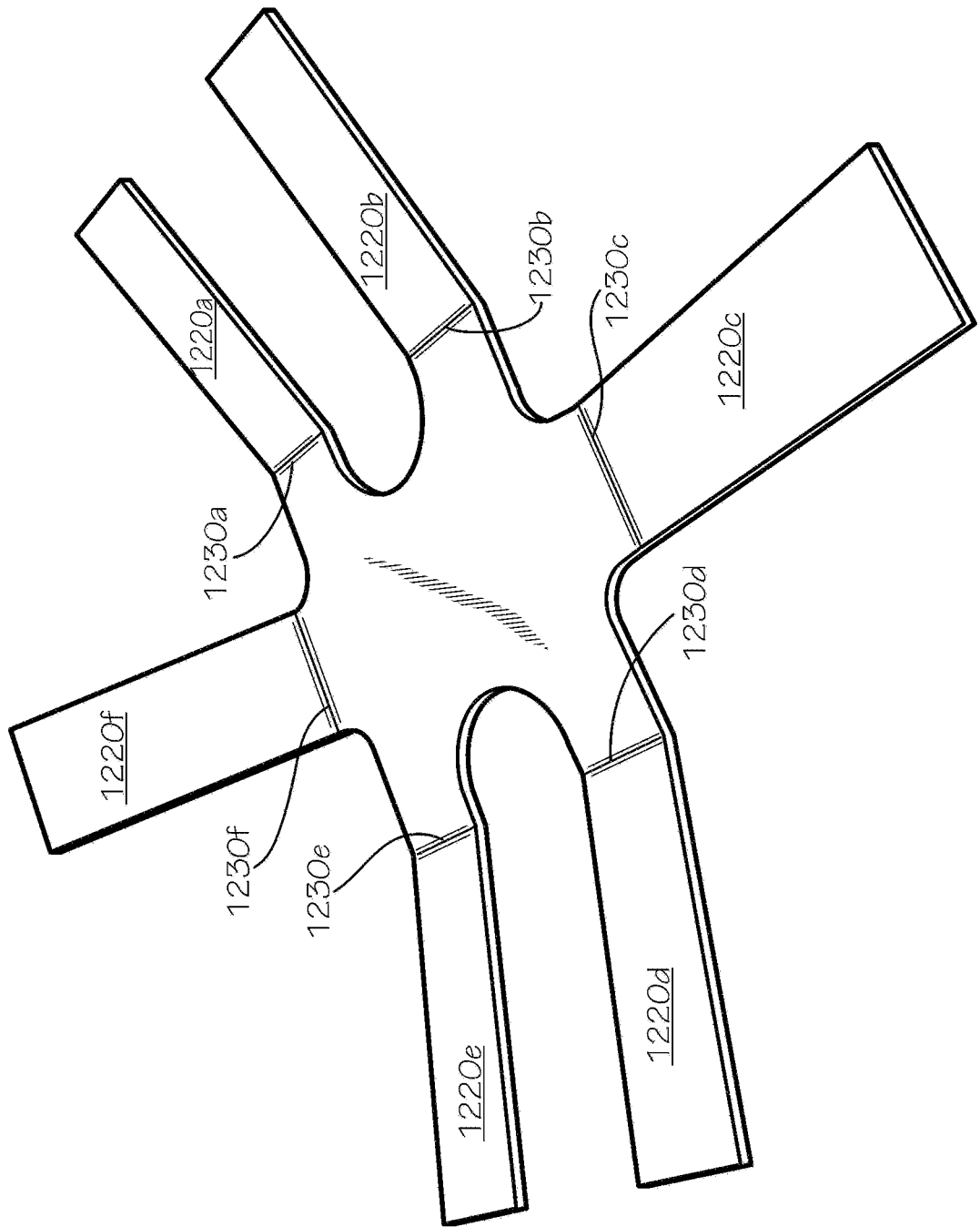
FIG. 13 is a perspective view of the blank of FIG. 12 with rails folded slightly upwards.

FIG. 13 is a perspective view of the box insert 1200. The vertical rails 1220a,b,c,d,e,f of the box insert 1200 can be configured to bend upward along the fold lines 1230a,b,c, d,e,f. As shown in the current aspect, the fold lines 1230a, b,c,d,e,f between the vertical rails 1220a,b,c,d,e,f and the center segment 1210 can coincide with the fold lines 530a, b,c,d between the bottom panel 510 and the side panels 520a,b,c,d of the interior piece 500.

Figure 14:
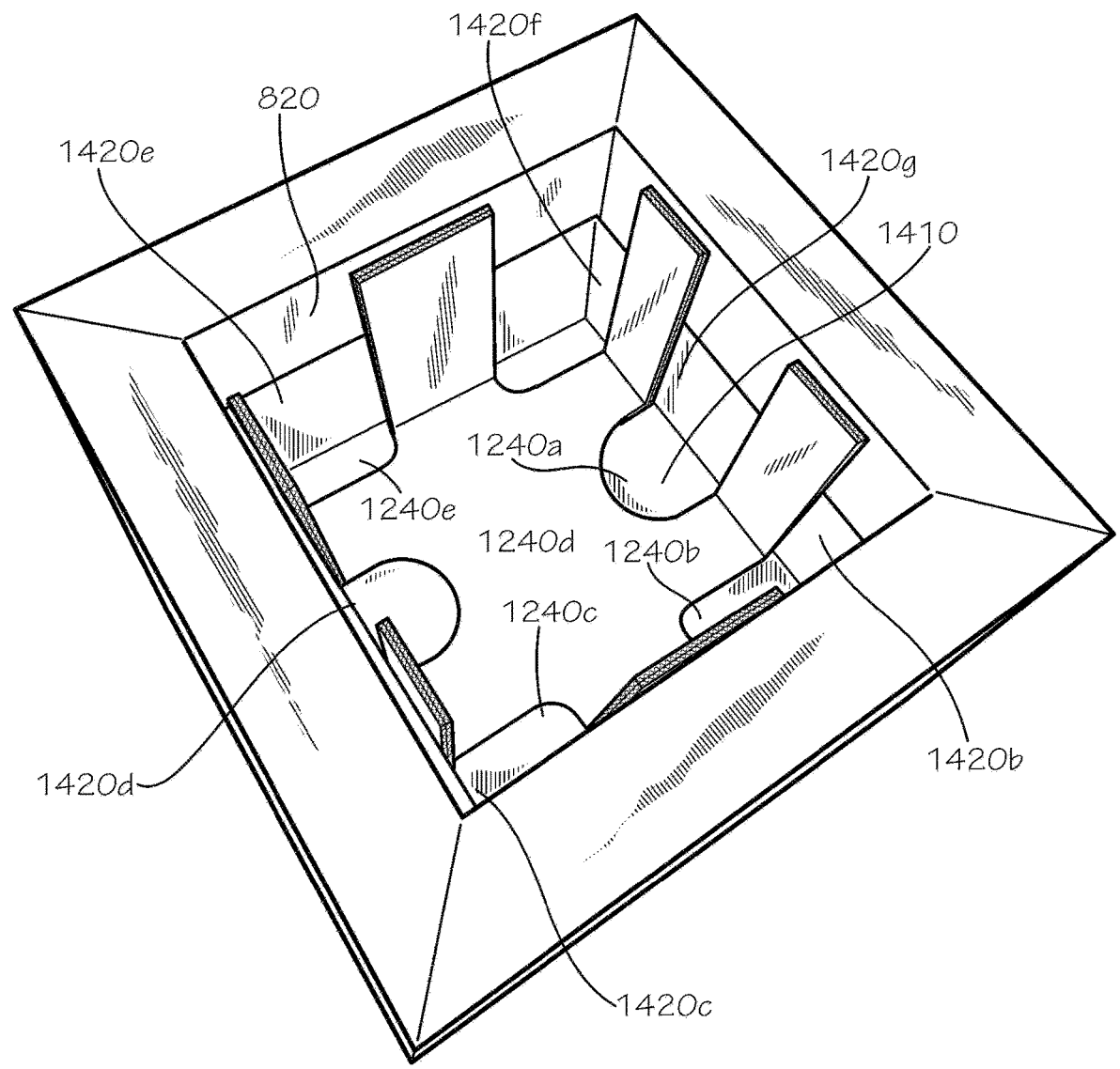
FIG. 14 is a perspective view of the insert with vertical rails inside the insulated box.

FIG. 14 is a perspective view of the box insert 1200 inside the insulated box 2400. The cutouts 1240a,b,c,d,e,f can be configured to expose regions of a bottom 1410 of the cavity 710. The box insert 1200 can be configured to allow air to flow to and from the cutouts 1240a,b,c,d,e,f and spaces 1420a,b,c,d,e,f between the vertical rails. The vertical rails 1220a,b,c,d,e,f can be configured to extend to the top interior portion 820.

Figure 15:
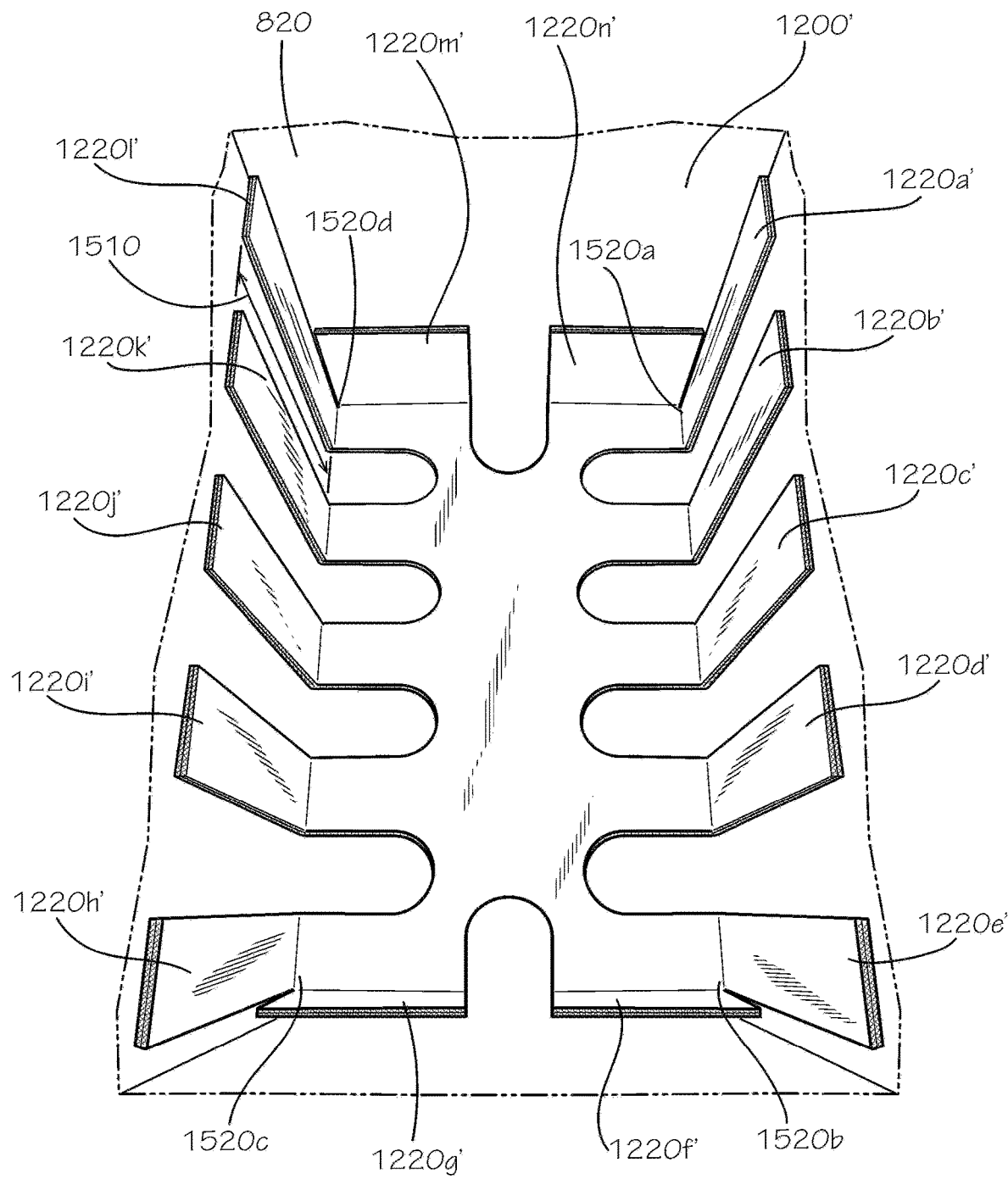
FIG. 15 is a perspective view of the insert with vertical rails in accordance with another aspect of the present disclosure.

FIG. 15 is a perspective view of the box insert 1200' in another exemplary aspect. In the current aspect, the vertical rails 1220a',b',c',d',e',f',g',h',i',j',k',l',m',n' can be configured to rise to a height 1510 below the top interior portion 820. The vertical rails 1220a',e',f',g',h',l',m',n' can also be configured to adjoin each other at bottom corners 1520a,b,c, d—without a space 1420 between them.

Figure 16:
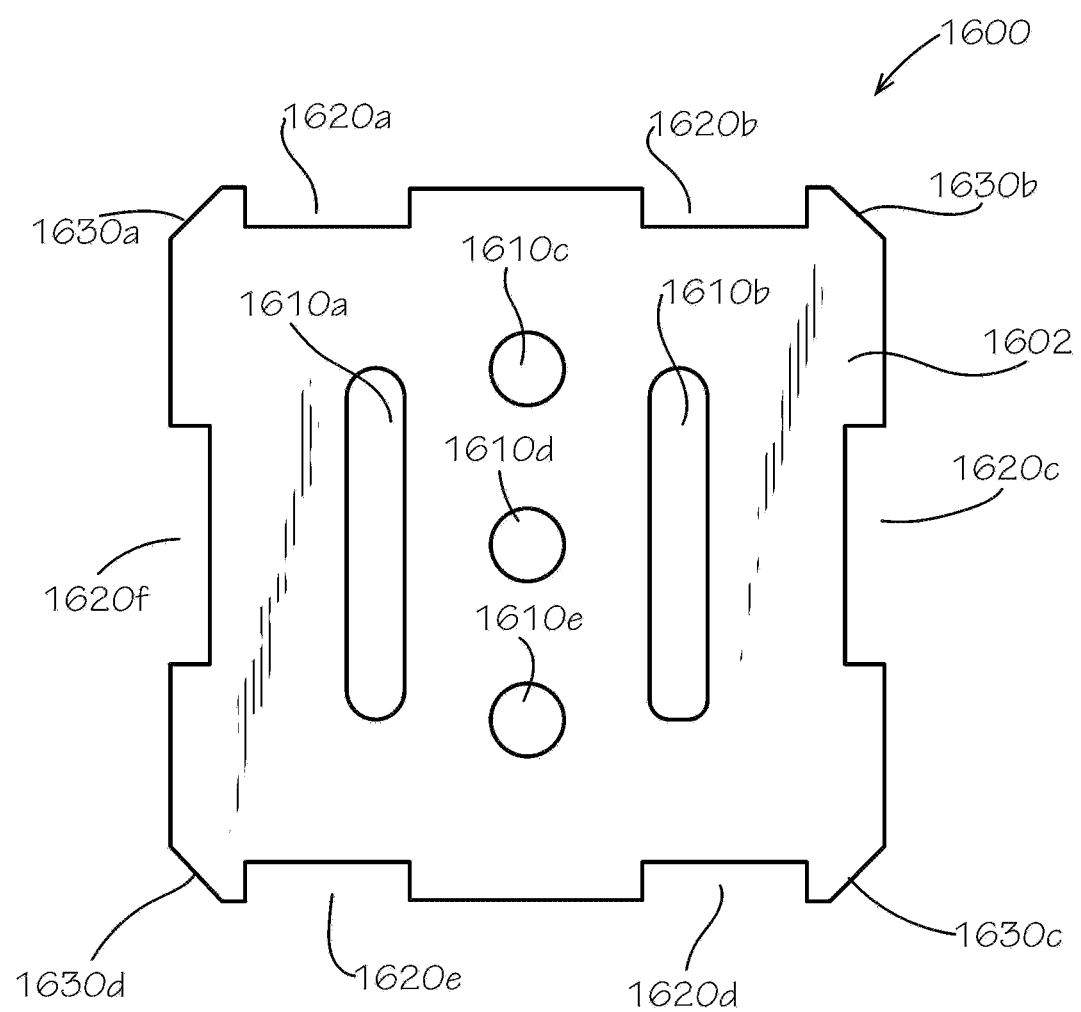
FIG. 16 is a top view of a register configured to slide up and down along the vertical rails of the insert of FIG. 12.

FIG. 16 is a top view of a register 1600. The register 1600 can comprise a face segment 1602. The face segment 1602 can comprise holes 1610a,b,c,d; side cutouts 1620a,b,c,d,e, f; and corner cutouts 1630a,b,c,d. The register can be cut from a single flat piece.

Figure 17:
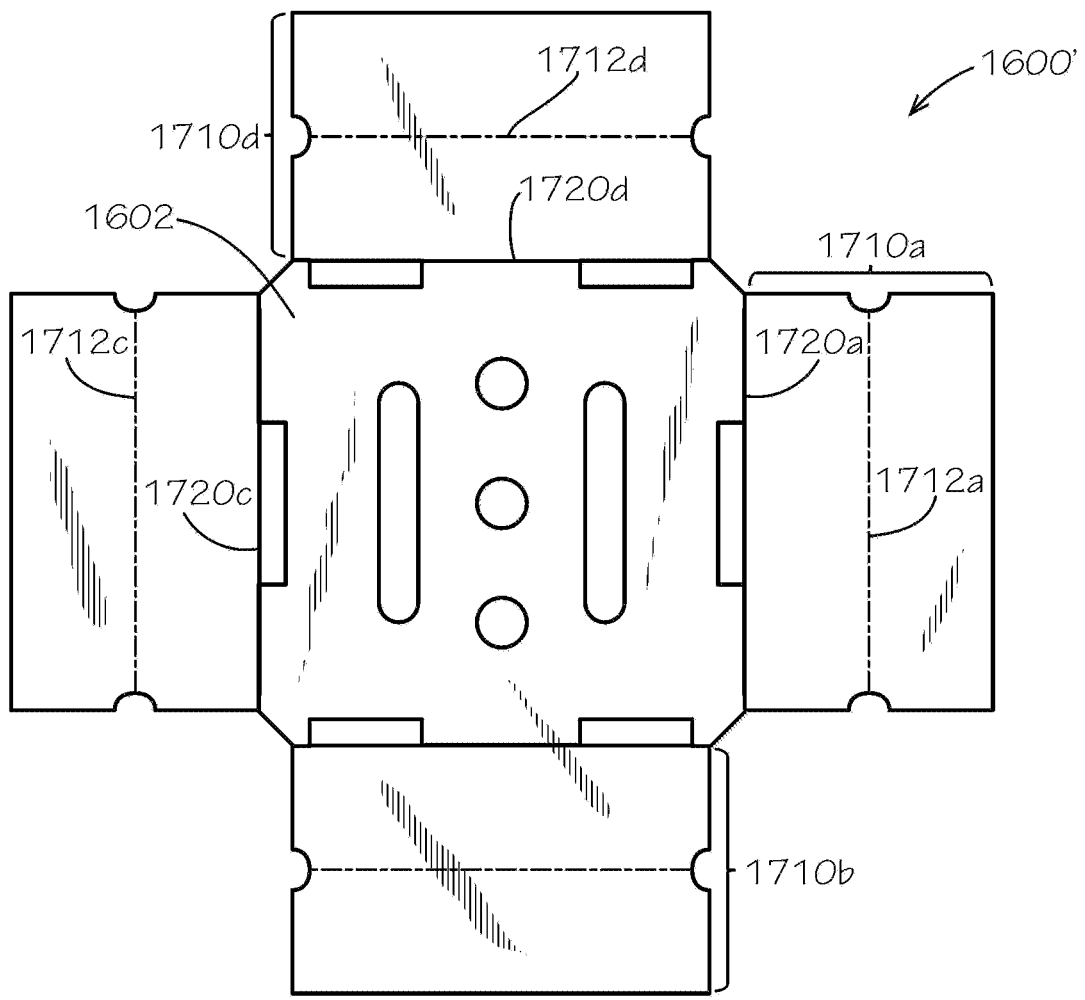
FIG. 17 is a top view of a register configured to slide up and down along the vertical rails of the insert of FIG. 12 in accordance with another aspect of the present disclosure.

FIG. 17 is a top view of a register 1700' in another exemplary aspect. The register 1600' can further comprise side segments 1700a,b,c,d joined to the face segment 1602 by fold lines 1720a,b,c,d. The side segments 1700a,b,c,d can comprise fold lines 1712a,b,c,d configured to be parallel to the corresponding fold lines 1720a,b,c,d.

Figure 18:
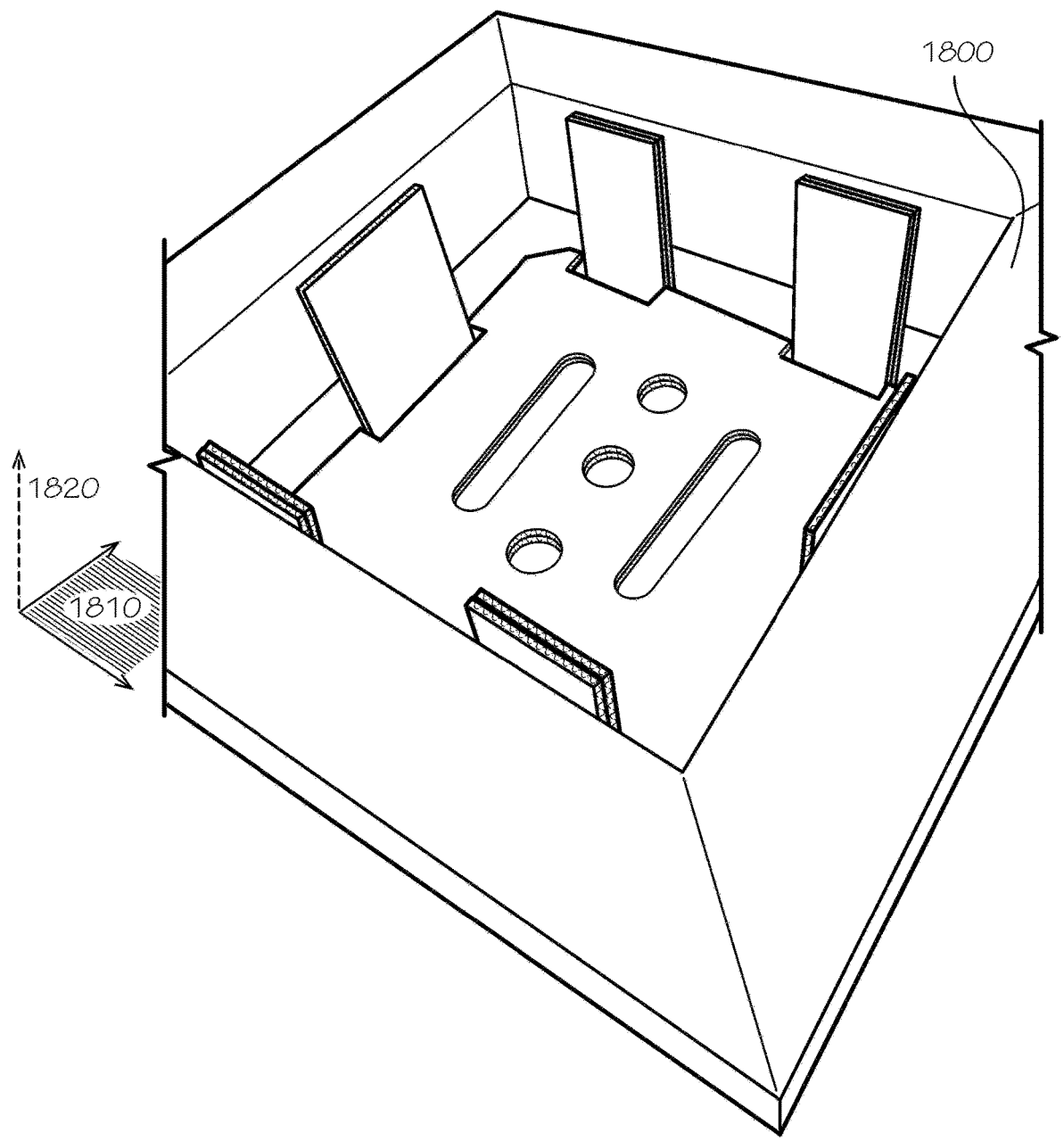
FIG. 18 is a perspective view of the register positioned in the insulated box as configured in FIG. 14.

FIG. 18 is a perspective view of the box insert 1200 receiving the register 1600. The register 1600 and the box insert 1200 can together form a registration system 1800. The registration system 1800 can be configured to allow the register 1600 to slide up and down the vertical rails 1220a, b,c,d,e,f along a vertical axis 1820 while the face segment 1602 is maintained in a horizontal plane 1810. The center segment 1210 can be configured to cover a bottom interior of the box 2400, and one or more of the vertical rails 1220a,b,c,d,e,f can be configured to cover a side interior of the box 2400. The register 1600 can be configured to slidably move along one or more of the vertical rails 1220a,b,c,d,e,f while maintaining a horizontal position, and the cutout 1620a,b,c,d,e,f of the register 1600 can be configured to surround one or more of the vertical rails 1220a, b,c,d,e,f of the box insert 1200.

Figure 19:
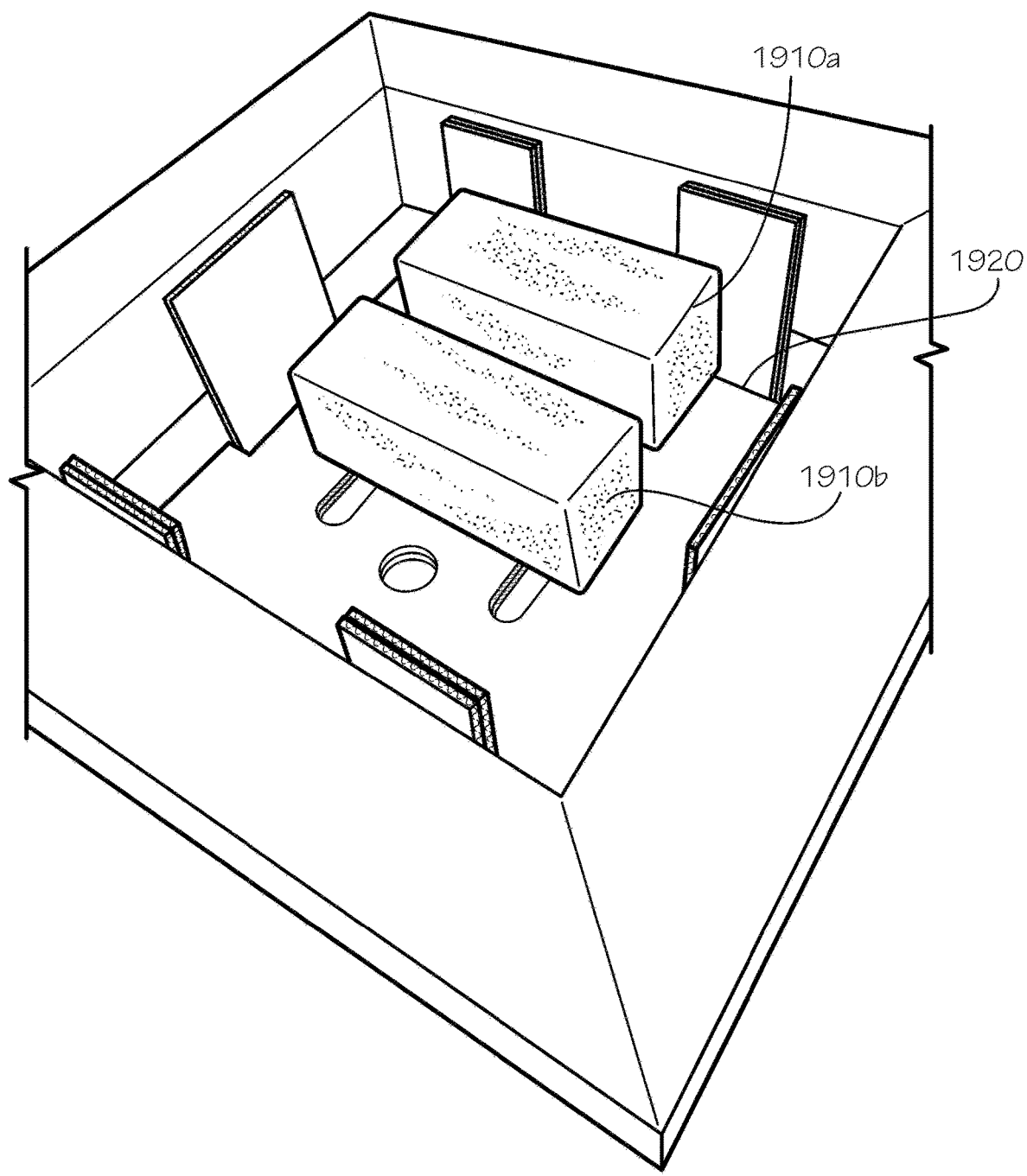
FIG. 19 is a perspective view of the insulated box of FIG. 18 comprising the register and with a representation of ice packs placed over the register.

FIG. 19 is a perspective view of the registration system 1800. The side cutouts 1620a,b,c,d,e,f can be configured to receive the vertical rails 1220a,b,c,d,e,f such that the register 1600 does not tip over when an overhead weight 1910a,b is placed near an edge 1920 of the face segment 1602 or when the register 1600 is not supported under a center of mass (not shown) of the register 1600 with the overhead weight 1910a,b.

Figure 20:
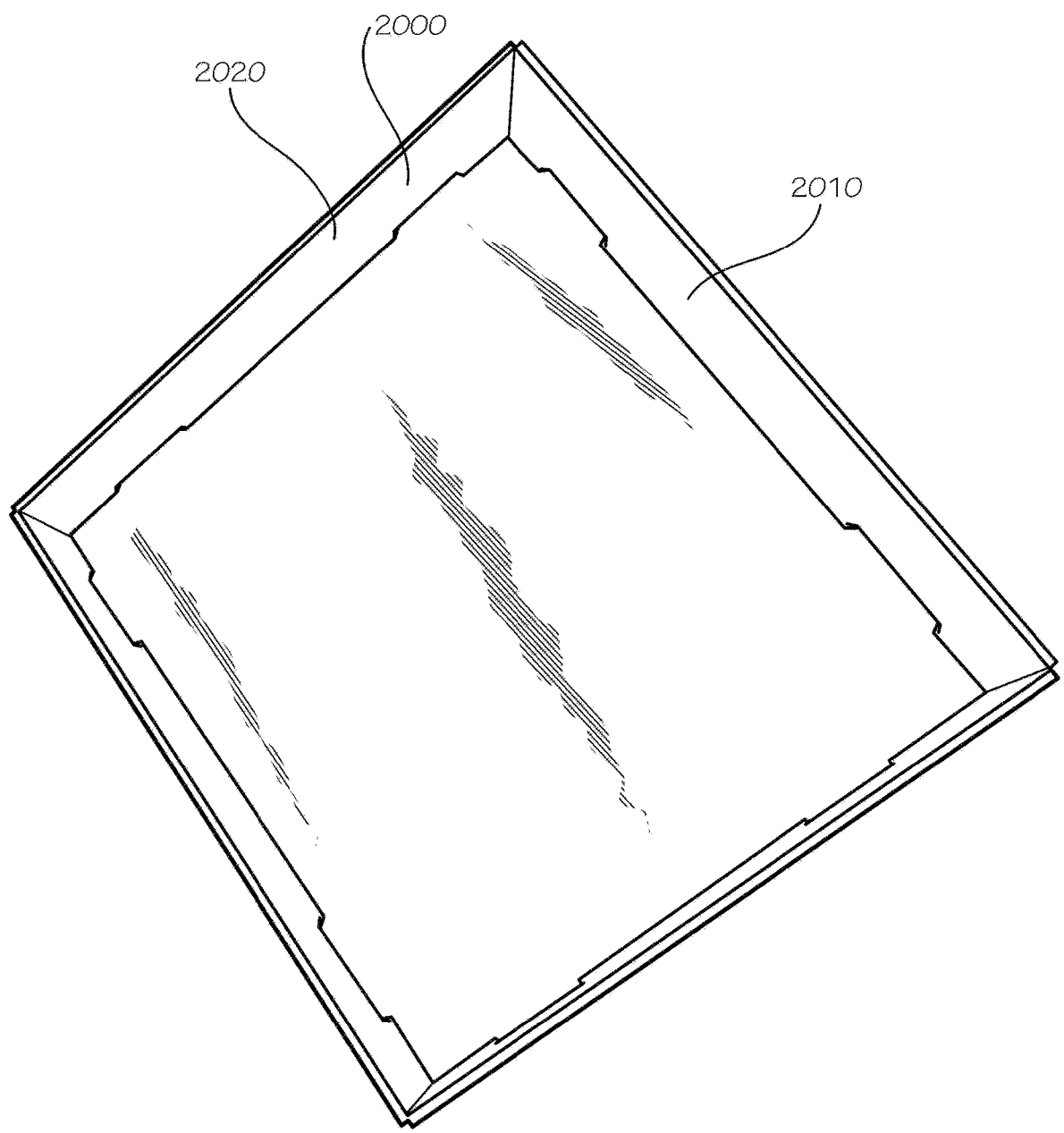
FIG. 20 is a perspective view of an assembled lid in accordance with another aspect of the present disclosure.

FIG. 20 is a perspective view of a lid 2000 for the insulated box 2400. The lid 2000 can comprise an inner piece 2010 and an outer piece 2020.

Figure 21:
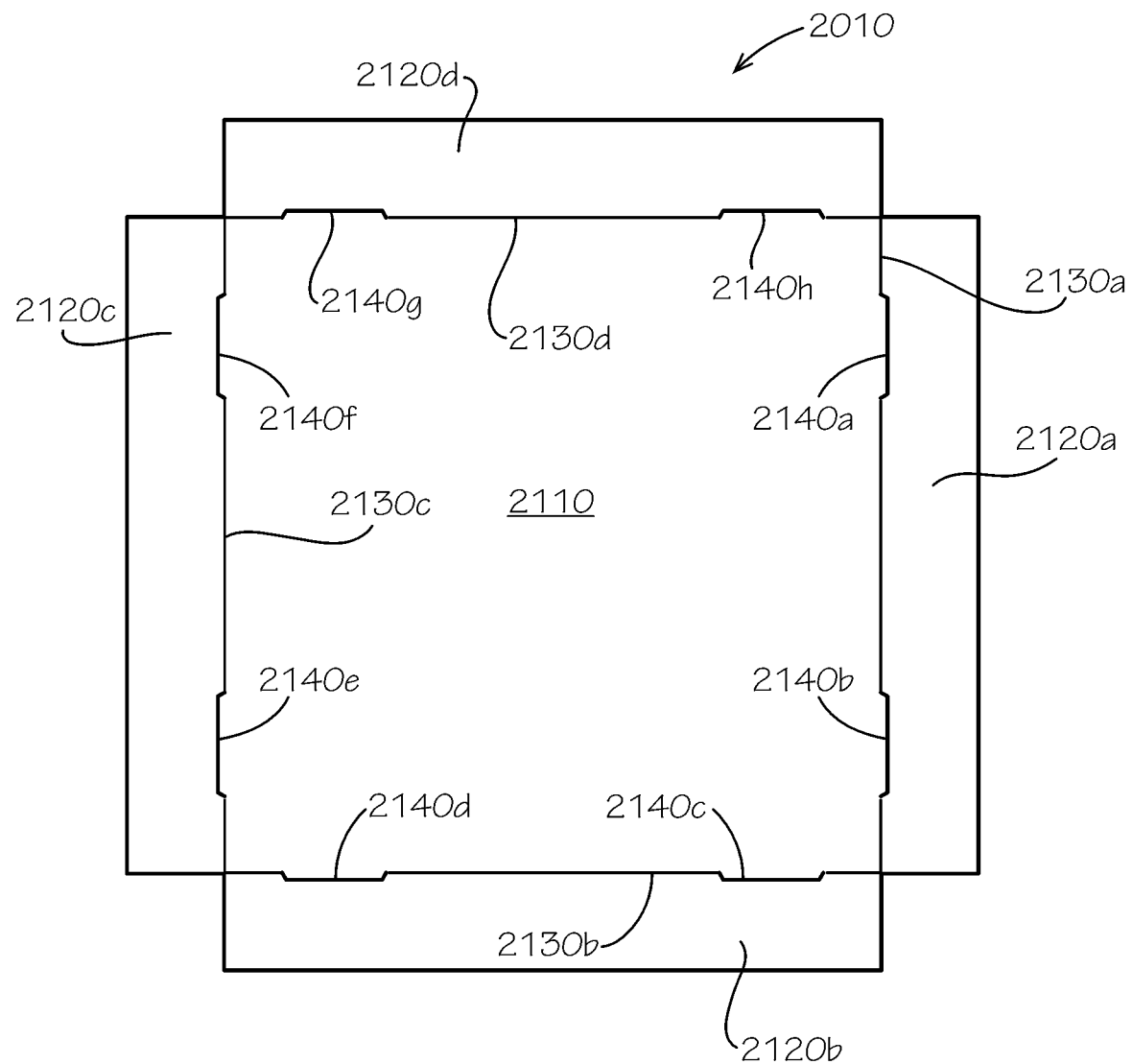
FIG. 21 shows a blank configured to be assembled into an inner piece of the lid of FIG. 19.

FIG. 21 is a top view of the inner piece 2010 of the lid 2000 in a flat, unassembled configuration. The inner piece 2010 can comprise a center segment 2110 and side segments 2120*a,b,c,d* joined to the center segment 2110 by fold lines 2130*a,b,c,d*. The fold lines 2130*a,b,c,d* can comprise tab cuts 2140*a,b,c,d,e,f,g,h*.

Figure 22:
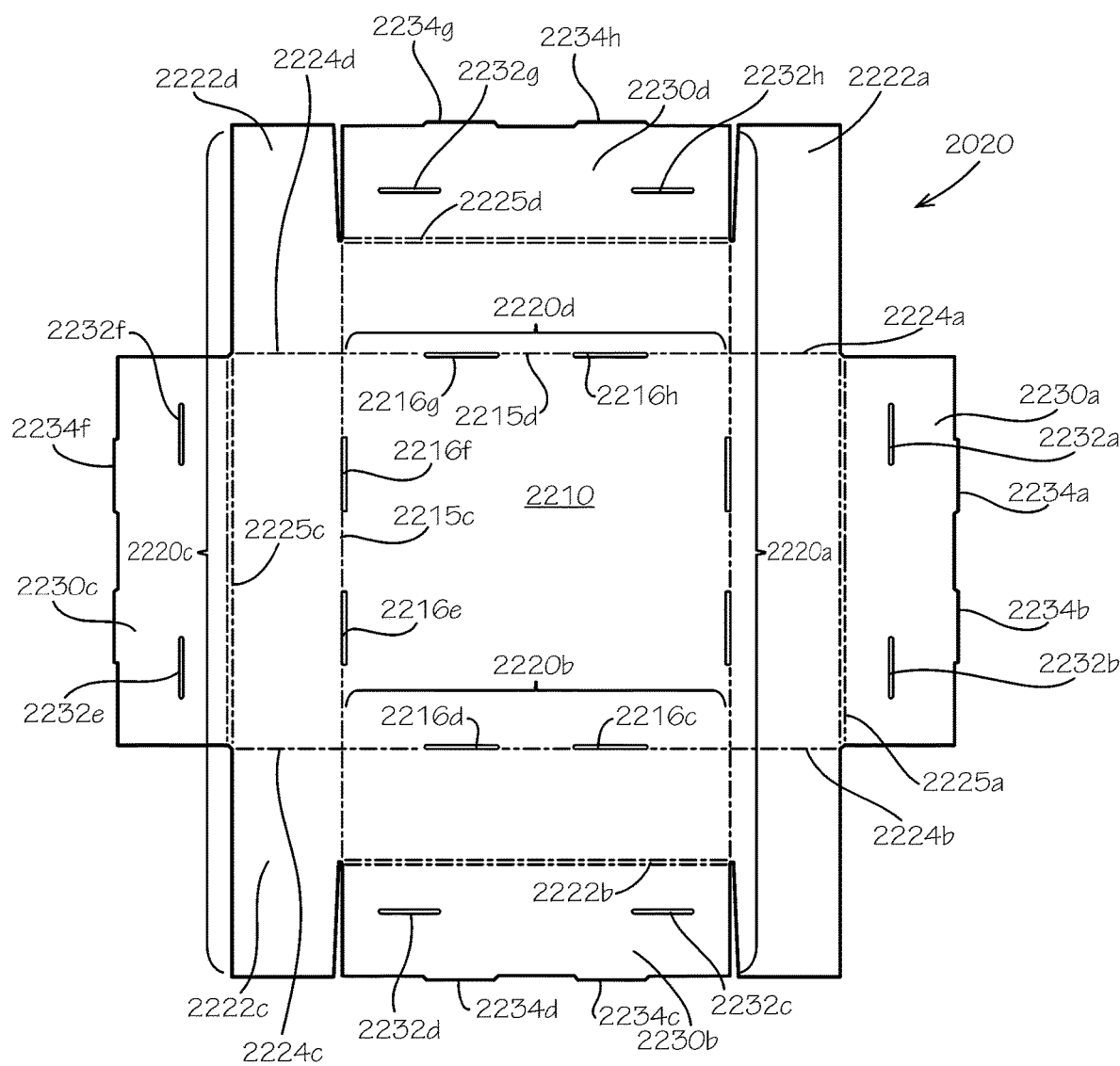
FIG. 22 shows a blank configured to be assembled into an outer piece of the lid of FIG. 19.

FIG. 22 is a top view of the outer piece 2020 of the lid 2000 in a flat, unassembled configuration. The outer piece 2020 can comprise a center segment 2210, connecting segments 2220*a,b,c,d* joined to the center segment 2210 by fold lines 2215*a,b,c,d*, and end segments 2230*a,b,c,d* joined to the connecting segments 2220*a,b,c,d* by fold lines 2225*a,b,c,d*. The fold lines 2225*a,b,c,d* can be double fold lines. Alternating segments, such as a first and a third connecting segment 2220*a,c*, can comprise side tabs 2222*a,b,c,d* joined to the connecting segments 2220*a,c* by fold lines 2224*a,b,c,d*. The fold lines 2215*a,b,c,d* joining the center segment 2210 to the connecting segments 2220*a,b,c,d* can comprise or define slots 2216*a,b,c,d,e,f,g,h*. The end segments 2230*a,b,c,d* can comprise tab slots 2232*a,b,c,d,e,f,g,h* and tabs 2234*a,b,c,d,e,f,g,h*. Any one or more of the fold lines disclosed herein can be defined by the parts joined by or at the corresponding fold line(s).

Figure 23:
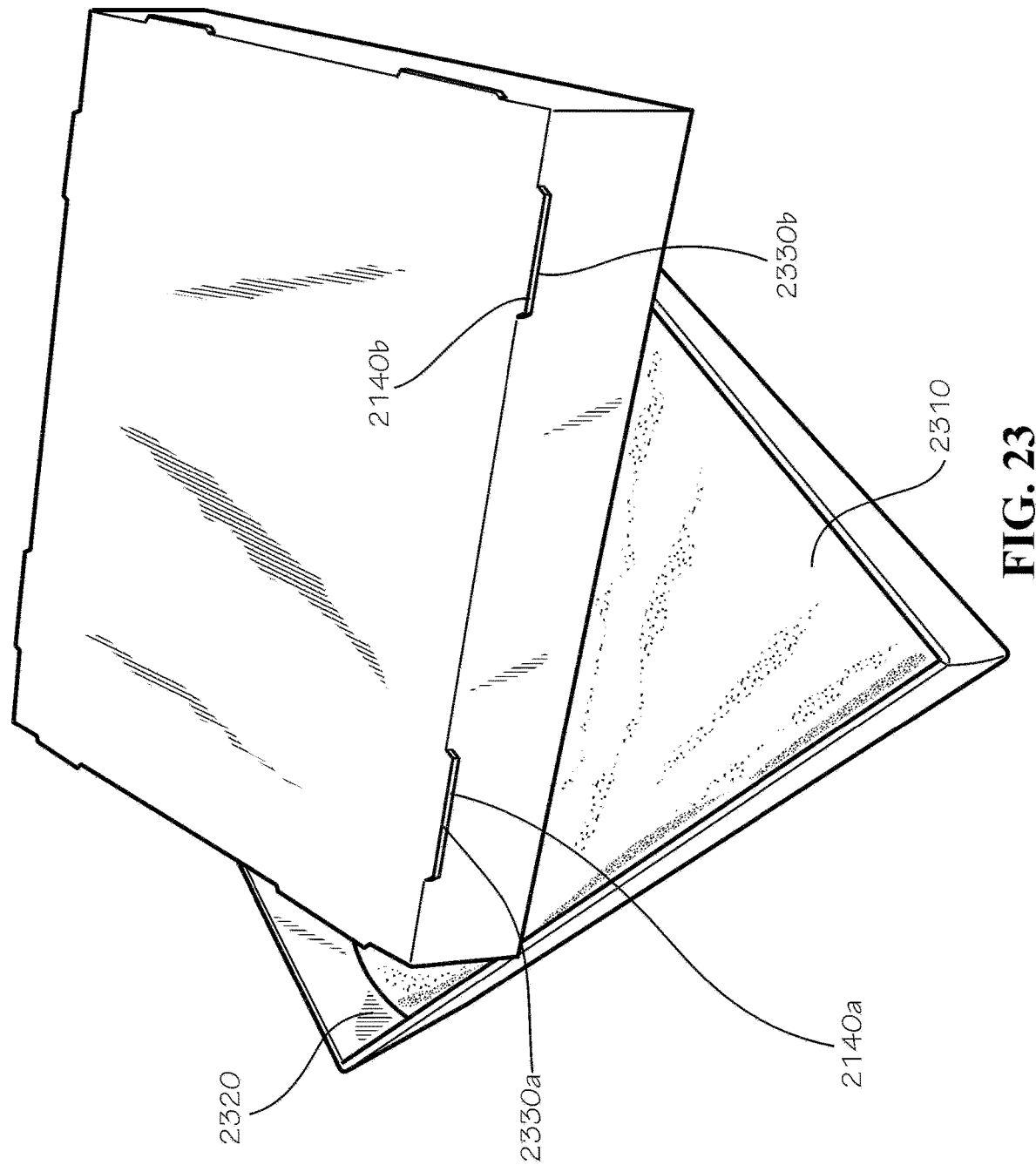
FIG. 23 is a perspective view of the lid of FIG. 19 in a partially assembled configuration.

FIG. 23 is a perspective view of a partially-assembled lid 2000. The lid 2000 can further comprise an insulator such as an insulating pad 2310 between the outer piece 2020 and the inner piece 2010. The side segments 2120*a,b,c,d* of the inner piece 2010 can fold toward a cavity 2320 of the outer piece 2020 in an assembled configuration. Folding the side segments 2120*a,b,c,d* in this way can expose the tabs 2330*a,b* (and others not shown) formed by the tab cuts 2140*a,b,c,d,e,f,g,h*. The tabs 2330*a,b* can be received by the tab slots 2232*a,b,c,d,e,f,g,h* such that the insulating pad 2310 and the inner piece 2010 are secured. The outer piece 2020 can be assembled by sandwiching the side tabs 2222*a,b,c,d* between neighboring connecting segments 2220*b,d* and end segments 2230*b,d*.

Figure 24:
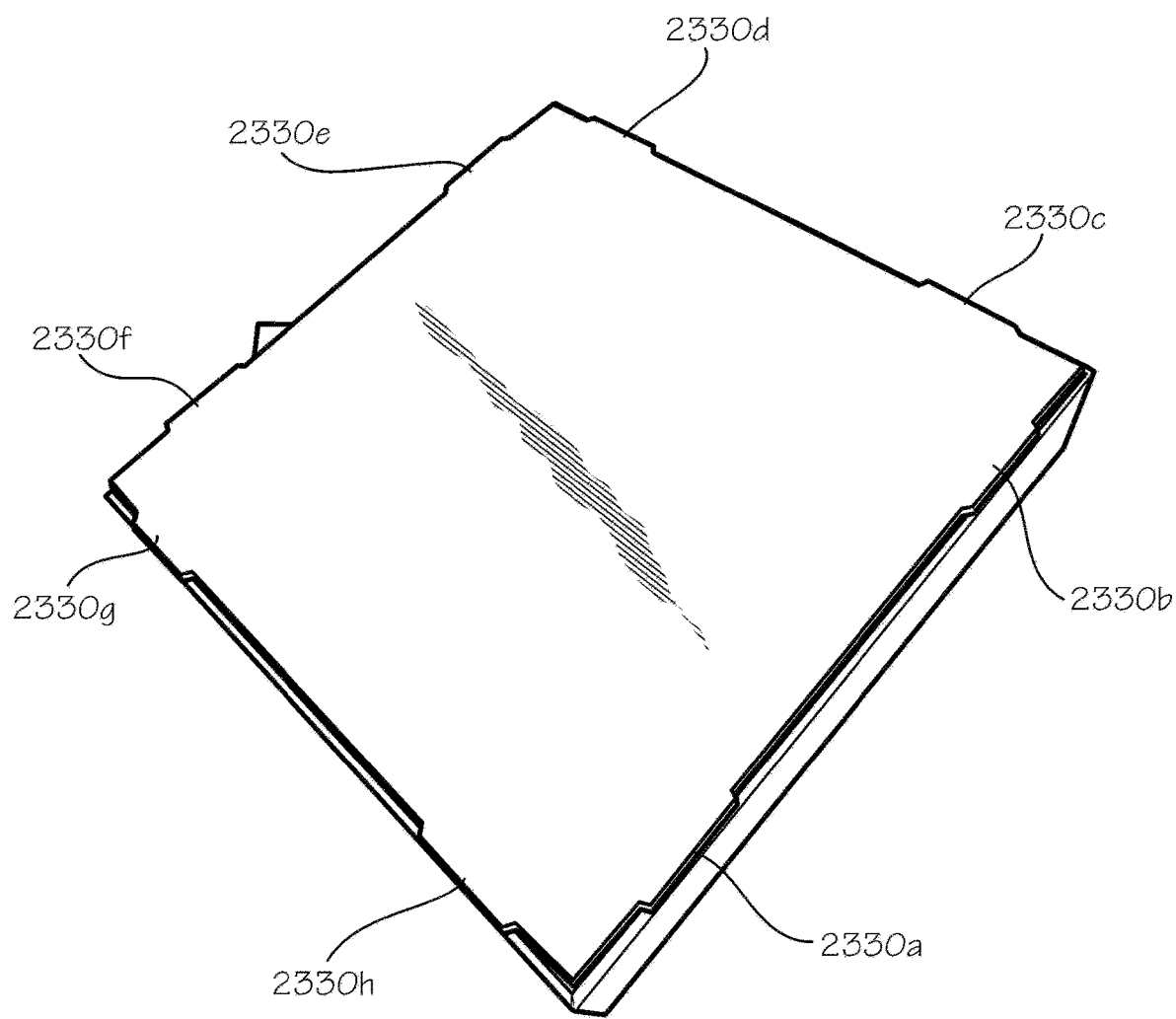
FIG. 24 is a perspective view of the lid of FIG. 19 in another partially assembled configuration prior to one remaining step of pushing the inner piece of the lid into the outer piece of the lid such that tabs of the inner piece are secured by slots of the outer piece.

FIG. 24 shows another perspective view of the inner piece 2010 with its side segments 2120*a,b,c,d* folded into the outer piece 2020, the inner piece 2010 ready to be pushed in, locking the tabs 2330*a,b,c,d,e,f* of the inner piece 2010 into the tab slots 2232*a,b,c,d,e,f,g,h* of the outer piece 2020 (shown in FIG. 22).

Figure 25:
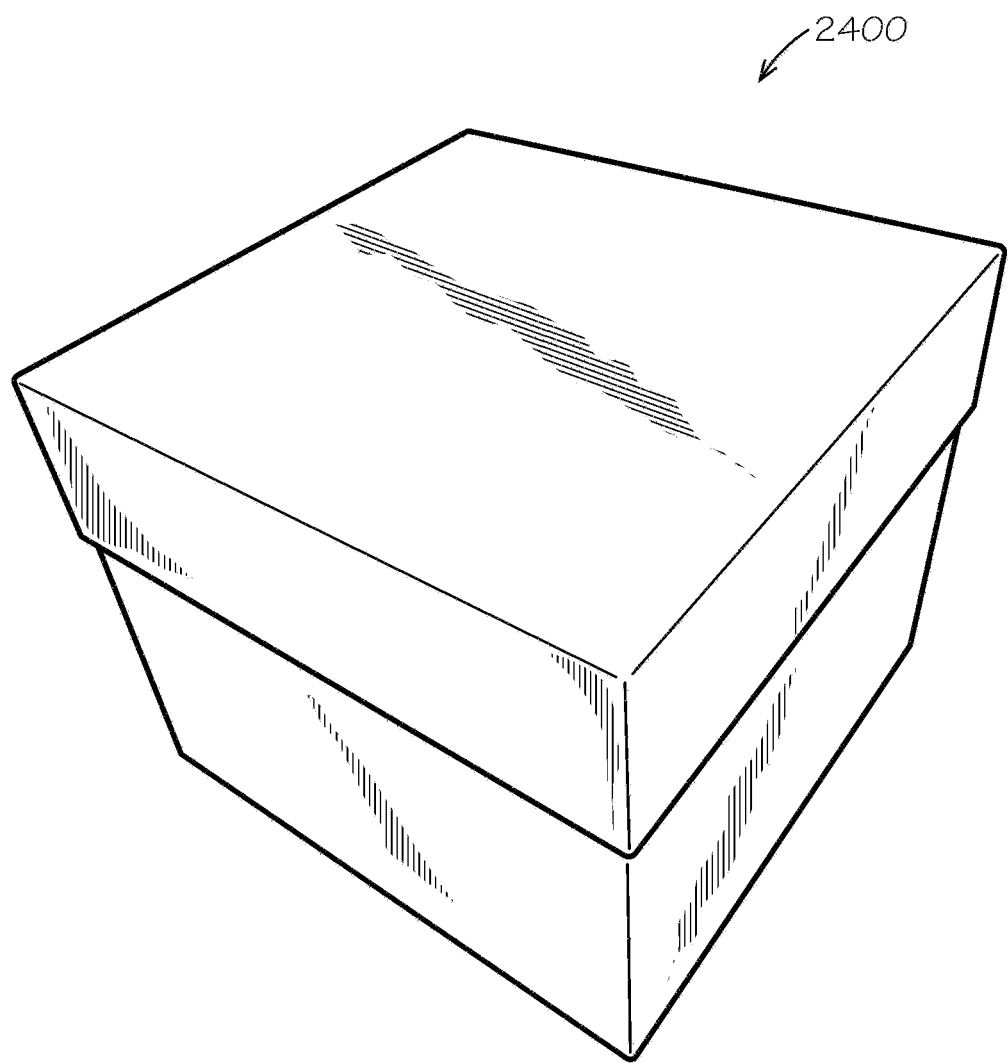
FIG. 25 is a perspective view of the insulated box covered by the lid.

FIG. 25 shows the assembled insulated box 2400 covered by the lid 2000.

The interior piece 500 and the exterior piece 100 of the insulated box 2400, the register 1600, the box insert 1200 with vertical rails 1220, and the inner piece 2010 and the outer piece 2020 of the lid 2000 can each be formed from a single piece of flat material, such as solid cardboard, corrugated cardboard, corrugated plastic, and other materials known in the art. The box insert 1200 with vertical rails 1220 can also be used with or without the register 1600 to maintain a uniform temperature and humidity level within the insulated box 2400. The spaces 1420 between the vertical rails 1220, the cutouts 1620 exposing the bottom 1410 of the cavity 710, and the holes 1610 in the register 1600 can all facilitate air flow and by diffusion and convection.

The registration system 1800 can be configured to place perishable items such as food (not shown) on one side of the register 1600 and a heat transfer element such as an ice pack (not shown) on the other. The ice pack can be place above the food to allow cooling by cold air flowing downward. Multiple registers 1600 can be used.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A box assembly comprising:
an exterior piece comprising:
  a plurality of middle portions, and
  a plurality of upper portions each joined to a different middle portion of the plurality of middle portions, each upper portion comprising:
    a connecting segment joined to the respective middle portion, and
    an end segment joined to the respective connecting segment;
an interior piece positioned within the exterior piece, the interior piece defining a cavity and comprising a plurality of side panels, each side panel of the plurality of side panels comprising a top interior portion, the plurality of side panels and the plurality of middle portions of the exterior piece defining a space therebetween, the connecting segment of each upper portion of the plurality of upper portions covering the space, each upper portion of the plurality of upper portions of the exterior piece covering the space and the top interior portions of the plurality of side panels; and
a bottom panel joined to at least one side panel of the plurality of side panels; and
wherein a first end segment of a first upper portion of the plurality of upper portions comprises:
  a middle tab covering a first side panel of the plurality of side panels, and
  a side tab joined to the middle tab, the side tab covering a second side panel of the plurality of side panels adjacent to the first side panel covered by the middle tab.

2. The box assembly of claim 1, wherein at least one upper portion of the plurality of upper portions of the exterior piece is folded into the cavity of the interior piece.

3. The box assembly of claim 1, wherein a second end segment of the plurality of end segments comprises a middle tab covering the second side panel of the plurality of side panels, and wherein the second end segment is adjacent to the first end segment and is folded over the side tab, the second end segment sandwiching the side tab between the second side panel of the plurality of side panels and the middle tab of the second end segment.

4. The box assembly of claim 1, wherein the space is filled with an insulator.

5. The box assembly of claim 4, wherein the insulator is repulpable.

6. The box assembly of claim 5, wherein the insulator comprises:
   a front side insulator pad extending from a left middle portion of the plurality of middle portions of the exterior piece to a right middle portion of the plurality of middle portions, the right middle portion positioned opposite to the left middle portion;
   a back side insulator pad opposite to the front side insulator pad, the back side insulator pad extending from the left middle portion to the right middle portion;
   a left side insulator pad extending from an inner facing surface of the front side insulator pad to an inner facing surface of the back side insulator pad; and
   a right side insulator pad opposite to the left side insulator pad, the right side insulator pad extending from the inner facing surface of the front side insulator pad to the inner facing surface of the back side insulator pad.

7. The box assembly of claim 4, wherein the insulator comprises a side insulator pad and a bottom insulator pad.

8. The box assembly of claim 1, wherein:
   the plurality of side panels of the interior piece comprises four side panels,
   each side panel is joined to the bottom panel by a fold line, and
   each side panel is connected to each other side panel only by the bottom panel when the interior piece is in an unfolded configuration.

9. The box assembly of claim 8, wherein the four side panels comprise:
   a front side panel extending from a left middle portion of the plurality of middle portions to a right middle portion of the plurality of middle portions,
   a back side panel extending from the left middle portion to the right middle portion,
   a left side panel extending from an inner facing surface of the front side panel to an inner facing surface of the back side panel, and
   a right side panel extending from the inner facing surface of the front side panel to the inner facing surface of the back side panel.

10. The box assembly of claim 1, further comprising an insert, the insert comprising:
    a center segment covering the bottom panel of the interior piece, and
    a rail joined to the center segment, the rail configured to cover at least one side panel of the plurality of side panels of the interior piece.

11. The box assembly of claim 10, wherein the center segment defines a cutout exposing a fold line that joins the at least one side panel to the bottom panel of the interior piece.

12. The box assembly of claim 11, wherein the rail is joined to the center segment by a fold line, and the fold line that joins the rail and the center segment is configured to coincide with the fold line that joins the at least one side panel to the bottom panel of the interior piece.

13. The box assembly of claim 1, further comprising a lid, the lid comprising:
    an outer piece comprising a center segment and a rim, the rim maintaining the center segment in axial alignment with the box;
    an inner piece inside the outer piece, the inner piece and the outer piece defining a space therebetween; and
    a repulpable insulator pad within the space of the lid.

\* \* \* \* \*